(12) United States Patent
Chen et al.

(10) Patent No.: US 10,193,684 B2
(45) Date of Patent: Jan. 29, 2019

(54) METHOD AND APPARATUS FOR SIGNAL PROCESSING

(71) Applicant: Huawei Technologies Co., Ltd., Shenzhen (CN)

(72) Inventors: Teyan Chen, Shenzhen (CN); Sheng Liu, Shenzhen (CN); Hong Cheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 120 days.

(21) Appl. No.: 15/347,633

(22) Filed: Nov. 9, 2016

(65) Prior Publication Data

US 2017/0063518 A1    Mar. 2, 2017

Related U.S. Application Data

(63) Continuation of application No. PCT/CN2014/077169, filed on May 9, 2014.

(51) Int. Cl.
   *H04L 5/14* (2006.01)
   *H04L 27/38* (2006.01)

(52) U.S. Cl.
   CPC .......... *H04L 5/1461* (2013.01); *H04L 27/38* (2013.01)

(58) Field of Classification Search
   None
   See application file for complete search history.

(56) References Cited

U.S. PATENT DOCUMENTS

| | | | |
|---|---|---|---|
| 2004/0203472 A1* | 10/2004 | Chien | H04B 1/30 455/68 |
| 2008/0159442 A1* | 7/2008 | Tanabe | H04L 27/3863 375/324 |
| 2011/0243263 A1* | 10/2011 | Andgart | H04L 5/0048 375/260 |
| 2011/0268232 A1* | 11/2011 | Park | H04B 1/30 375/344 |
| 2013/0286903 A1 | 10/2013 | Khojastepour et al. | |

FOREIGN PATENT DOCUMENTS

| CN | 101785190 A | 7/2010 |
|---|---|---|
| CN | 102057644 A | 5/2011 |

\* cited by examiner

*Primary Examiner* — Eunsook Choi
(74) *Attorney, Agent, or Firm* — Slater Matsil, LLP

(57) ABSTRACT

The present embodiments relate to the field of communications, and discloses a signal processing method and apparatus, which can implement self-interference cancellation when in-phase quadrature (IQ) imbalance exists in a communications system. An embodiment is acquiring, a digital baseband reference signal, a self-interference reference signal, and a frequency-domain baseband signal. The method also includes obtaining, according to the digital baseband reference signal, a basic reference signal and an image reference signal that are image to each other and estimating an estimated value of a first comprehensive response and an estimated value of a second comprehensive response according to the basic reference signal, the image reference signal, and the self-interference reference signal. Additionally, the method includes calculating a self-interference signal according to the estimated value of the first comprehensive response, the estimated value of the second comprehensive response, the basic reference signal, and the image reference signal, so as to perform self-interference cancellation on the frequency-domain baseband signal.

15 Claims, 5 Drawing Sheets

METHOD AND APPARATUS FOR SIGNAL PROCESSING

CROSS-REFERENCE TO RELATED APPLICATIONS

This application is a continuation of International Application No. PCT/CN2014/077169, filed on May 9, 2014, the disclosure of which is hereby incorporated by reference in its entirety.

TECHNICAL FIELD

Embodiments relate to the field of communications, and in particular, to a signal processing method and apparatus.

BACKGROUND

In a wireless communications system such as a mobile cellular communications system, a wireless local area network (WLAN) system, or fixed wireless access (FWA) system, communications nodes such as a base station (BS) or an access point (AP), a relay station (RS), and user equipment (UE) usually have capabilities of transmitting their own signals and receiving a signal from another communications node. Because a radio signal attenuates greatly on a radio channel, compared with a signal transmitted by a communications node, a signal from a communication peer end has been very weak when arriving at a receive end. For example, a power difference between a received signal and a transmitted signal of a communications node in the mobile cellular communications system reaches 80 dB to 140 dB or even higher. Therefore, to avoid self-interference from a transmitted signal to a received signal of a same signal transceiver, radio signal sending and receiving are usually performed by using different frequency bands or different time periods. For example, in frequency division duplex (FDD), sending and receiving are performed by using different frequency bands separated by a specific guard band; in time division duplex (TDD), sending and receiving are performed by using different time periods at a specific guard interval. Both the guard band in the FDD system and the guard interval in the TDD system are used to ensure adequate isolation between receiving and sending, so as to avoid interference from sending to receiving.

Different from an existing FDD or TDD technology, a wireless full-duplex technology supports simultaneous receiving and sending operations on a same radio channel. In this case, spectral efficiency of the wireless full-duplex technology is twice as much as that of the FDD or TDD technology theoretically. A premise for implementing wireless full-duplex is to avoid, reduce, and cancel as much as possible strong interference (referred to as self-interference, Self-interference) from a transmitted signal to a received signal of a same signal transceiver, so that the strong interference causes no impact on correct reception of a wanted signal.

In an existing wireless full-duplex system, a DAC (Digital to Analog Converter), an up-converter, and a power amplifier that are on a transmit channel, a low noise amplifier (LNA), a down-converter, and an ADC (Analog to Digital Converter) that are on a receive channel, and the like are functional modules of an intermediate frequency unit of an existing signal transceiver. Cancellation of self-interference from a transmitted signal is completed by a spatial interference suppression unit, a radio frequency front-end analog interference cancellation unit, a digital cancellation interference unit, and the like. In the existing wireless full-duplex system, analog self-interference cancellation is mainly to eliminate an interference signal that passes through a self-interference main path. Digital cancellation interference is a supplement of the analog interference cancellation and is to eliminate, in a baseband, a self-interference signal remaining in a digital received signal.

An existing digital interference cancellation technology is mainly to perform interference reconstruction and cancellation based on a self-interference signal model. However, due to impact of a non-ideal feature of a signal transceiver, a received self-interference signal cannot be absolutely represented by using an ideal signal model and further, cannot be reconstructed or canceled. Therefore, interference cancellation performance of the prior art is limited by the non-ideal feature of the signal transceiver. In an example in which IQ (in-phase quadrature) imbalance exists, in a general communications system, a power of an image interference signal caused by IQ imbalance is 20 dB to 30 dB lower than a main signal power, and therefore, communication can be performed normally in a case in which IQ imbalance is not eliminated. However, for the existing wireless full-duplex system, because a power of the received self-interference signal is far greater than a power of a wanted signal sent by the communication peer end, and a power difference obtained after radio frequency interference cancellation is performed is still greater than 30 dB, the digital interference cancellation module can ensure normal communication with the communication peer end only after self-interference greater than 40 dB is canceled. However, an existing digital interference cancellation technology cannot effectively cancel an image interference signal caused by IQ imbalance. As a result, the digital interference cancellation technology cannot cancel self-interference greater than 40 dB, and self-interference cancellation cannot be implemented in the wireless full-duplex system.

The existing digital interference cancellation technology cannot effectively implement self-interference cancellation when IQ imbalance exists in a communications system, and digital interference cancellation performance is relatively poor.

SUMMARY

Embodiments provide a signal processing method and apparatus, where the signal processing method and apparatus can implement self-interference cancellation when IQ imbalance exists in a communications system, thereby improving digital interference cancellation performance.

To achieve the foregoing objective, the following technical solutions are used in the embodiments.

According to a first aspect, a signal processing apparatus is provided, including an acquiring unit, configured to acquire a digital baseband reference signal, a self-interference reference signal, and a frequency-domain baseband signal and a transformation unit, configured to obtain a basic reference signal and an image reference signal image reference signal according to the digital baseband reference signal acquired by the acquiring unit, where the image reference signal image reference signal is an image signal of the basic reference signal. The signal processing apparatus also includes an estimation unit, configured to estimate an estimated value of a first comprehensive response and an estimated value of a second comprehensive response according to the basic reference signal obtained by the transformation unit, the image reference signal image reference signal obtained by the transformation unit, and the self-interference reference signal acquired by the acquiring unit. Additionally, the signal processing apparatus includes a reconstruction unit, configured to calculate a self-interference signal according to the estimated value of the first comprehensive response that is estimated by the estimation unit, the estimated value of the second comprehensive response that is estimated by the estimation unit, the basic reference signal obtained by the transformation unit, and the image reference signal image reference signal obtained by the transformation unit, so that the signal processing apparatus performs self-interference cancellation on the frequency-domain baseband signal acquired by the acquiring unit.

With reference to the first aspect, in a first possible implementation manner, the basic reference signal includes a basic frequency-domain reference signal; the image reference signal image reference signal includes an image frequency-domain reference signal; the first comprehensive response includes a first comprehensive frequency-domain response; the second comprehensive response includes a second comprehensive frequency-domain response; and the self-interference reference signal includes a frequency-domain self-interference reference signal; and the estimation unit is specifically configured to estimate an estimated value $\hat{H}_1(f)$ of $H_1(f)$ and an estimated value $\hat{H}_2(f)$ of $H_2(f)$ according to a first formula:

$$Z(f)=H_1(f)S(f)+H_2(f)S^*(-f),$$

where S(f) is the basic frequency-domain reference signal obtained by the transformation unit, $S^*(-f)$ is the image frequency-domain reference signal obtained by the transformation unit, Z(f) is the frequency-domain self-interference reference signal acquired by the acquiring unit, $H_1(f)$ is the first comprehensive frequency-domain response, $\hat{H}_1(f)$ is the estimated value of the first comprehensive frequency-domain response $H_1(f)$, $H_2(f)$ is the second comprehensive frequency-domain response, and $\hat{H}_2(f)$ is the estimated value of the second comprehensive frequency-domain response $H_2(f)$.

With reference to the first aspect, in a second possible implementation manner, the basic reference signal includes a basic time-domain reference signal; the image reference signal includes an image time-domain reference signal; the first comprehensive response includes a first comprehensive time-domain response; the second comprehensive response includes a second comprehensive time-domain response; and the self-interference reference signal includes a time-domain self-interference reference signal; and the estimation unit is specifically configured to estimate an estimated value $\hat{H}_1(f)$ of $H_1(f)$ and an estimated value $\hat{H}_2(f)$ of $H_2(f)$ according to a first substitution formula:

$$Z(t)=H_1(t)\otimes S(t)+H_2(t)\otimes S^*(-t),$$

where s(t) is the basic time-domain reference signal obtained by the transformation unit, $s^*(-t)$ is the image time-domain reference signal obtained by the transformation unit Z(t) is the time-domain self-interference reference signal acquired by the acquiring unit, $H_1(t)$ is the first comprehensive time-domain response, and $H_2(t)$ is the second comprehensive time-domain response, where $H_1(f)$ is a Fourier transform value of $H_1(t)$, and $H_2(f)$ is a Fourier transform value of $H_2(t)$; and Z(f) is a Fourier transform value of Z(t).

With reference to the first possible implementation manner of the first aspect, in a third possible implementation manner, the estimation unit includes: a first estimation subunit, configured to acquire a second formula:

$$\{Z(f)\}_i = H_1(f)\{S(f)\}_i + H_2(f)\{S'(f)\}_i$$

according to the first formula:

$$Z(f)=H_1(f)S(f)+H_2(f)S^*(-f),$$

where the second formula is a relational expression about S(f) and $S^*(-f)$ of the $i^{th}$ frame that are acquired by the transformation unit and Z(f) of the $i^{th}$ frame that is acquired by the acquiring unit, and $S'(f)=S^*(-f)$; a second estimation subunit, configured to successively substitute S(f) and $S^*(-f)$, acquired by the transformation unit, of N frames from the $i^{th}$ frame and Z(f), acquired by the acquiring unit, of the N frames from the $i^{th}$ frame into the second formula:

$$\{Z(f)\}_i = H_1(f)\{S(f)\}_i + H_2(f)\{S'(f)\}_i$$

acquired by the first estimation subunit, to calculate an $N^{th}$-order system of linear equations Z(f)=S(f)H(f), where $$Z(f) = \begin{bmatrix} \{Z(f)\}_i \\ \{Z(f)\}_{i+1} \\ \vdots \\ \{Z(f)\}_{i+N-1} \end{bmatrix},$$

$$S(f) = \begin{bmatrix} \{S(f)\}_i & \{S'(f)\}_i \\ \{S(f)\}_{i+1} & \{S'(f)\}_{i+1} \\ \vdots & \vdots \\ \{S(f)\}_{i+N-1} & \{S'(f)\}_{i+N-1} \end{bmatrix}, \text{ and}$$

$$H(f) = \begin{bmatrix} H_1(f) \\ H_2(f) \end{bmatrix};$$

a third estimation subunit, configured to calculate, according to the matrices Z(f), S(f), and H(f) calculated by the second estimation subunit, an expression for expressing a relationship among Z(f), S(f), and $\hat{H}(f)$, where $\hat{H}(f)$ is an estimated value matrix of H(f), and $$\hat{H}(f) = \begin{bmatrix} \hat{H}_1(f) \\ \hat{H}_2(f) \end{bmatrix};$$

and a fourth estimation subunit, configured to calculate $\hat{H}_1(f)$ and with $\hat{H}_2(f)$ with reference to the expression for expressing the relationship among Z(f), S(f), and $\hat{H}(f)$ that is calculated by the third estimation subunit and $$\hat{H}(f) = \begin{bmatrix} \hat{H}_1(f) \\ \hat{H}_2(f) \end{bmatrix}.$$

With reference to the second possible implementation manner of the first aspect, in a fourth possible implementation manner, the estimation unit includes a first estimation subunit, configured to acquire a second formula:

$$\{Z(f)\}_i = H_1(f)\{S(f)\}_i + H_2(f)\{S'(f)\}_i$$

according to the first substitution formula:

$$Z(t)=H_1(t)\otimes S(t)+H_2(t)\otimes S^*(-t),$$

where the second formula is a relational expression about S(f) and $S^*(-f)$ of the $i^{th}$ frame that are acquired by the transformation unit and Z(f) of the $i^{th}$ frame that is acquired by the acquiring unit, and $S'(f)=S^*(-f)$; a second estimation subunit, configured to successively substitute S(f) and $S^*(-$ f), acquired by the transformation unit, of N frames from the $i^{th}$ frame and Z(f), acquired by the acquiring unit, of the N frames from the $i^{th}$ frame into the second formula:

$$\{Z(f)\}_i = H_1(f)\{S(f)\}_i + H_2(f)\{S'(f)\}_i$$

acquired by the first estimation subunit, to calculate an $N^{th}$-order system of linear equations $Z(f) = S(f)H(f)$, where $$Z(f) = \begin{bmatrix} \{Z(f)\}_i \\ \{Z(f)\}_{i+1} \\ \vdots \\ \{Z(f)\}_{i+N-1} \end{bmatrix},$$

$$S(f) = \begin{bmatrix} \{S(f)\}_i & \{S'(f)\}_i \\ \{S(f)\}_{i+1} & \{S'(f)\}_{i+1} \\ \vdots & \vdots \\ \{S(f)\}_{i+N-1} & \{S'(f)\}_{i+N-1} \end{bmatrix}, \text{ and}$$

$$H(f) = \begin{bmatrix} H_1(f) \\ H_2(f) \end{bmatrix};$$

a third estimation subunit, configured to calculate, according to the matrices Z(f), S(f), and H(f) calculated by the second estimation subunit, an expression for expressing a relationship among Z(f), S(f), and Ĥ(f), where Ĥ(f) is an estimated value matrix of H(f), and $$\hat{H}(f) = \begin{bmatrix} \hat{H}_1(f) \\ \hat{H}_2(f) \end{bmatrix};$$

and a fourth estimation subunit, configured to calculate $\hat{H}_1(f)$ and $\hat{H}_2(f)$ with reference to the expression for expressing the relationship among Z(f), S(f), and Ĥ(f) that is calculated by the third estimation subunit and $$\hat{H}(f) = \begin{bmatrix} \hat{H}_1(f) \\ \hat{H}_2(f) \end{bmatrix}.$$

With reference to the third or fourth possible implementation manner of the first aspect, in a fifth possible implementation manner, the third estimation subunit is specifically configured to substitute the matrices Z(f), S(f), and H(f) calculated by the second estimation subunit into a third formula:

$$\hat{H}(f) = \underset{H(f)}{\operatorname{argmin}} \|Z(f) - S(f)H(f)\|^2,$$

to calculate a fourth formula:

$$\hat{H}(f) = [S^H(f)S(f)]^{-1} S^H(f) Z(f),$$

where $S^H(f)$ is a conjugate transpose matrix of S(f), and $$\hat{H}(f) = \begin{bmatrix} \hat{H}_1(f) \\ \hat{H}_2(f) \end{bmatrix};$$

and the fourth estimation subunit is specifically configured to calculate $\hat{H}_1(f)$ and $\hat{H}_2(f)$ with reference to the fourth formula:

$$\hat{H}(f) = [S^H(f)S(f)]^{-1} S^H(f) Z(f)$$

calculated by the third estimation subunit and $$\hat{H}(f) = \begin{bmatrix} \hat{H}_1(f) \\ \hat{H}_2(f) \end{bmatrix}.$$

With reference to the third or fourth possible implementation manner of the first aspect, in a sixth possible implementation manner, the third estimation subunit is specifically configured to substitute the matrices Z(f), S(f), and H(f) calculated by the second estimation subunit into a third substitution formula:

$$\hat{H}(f) = \underset{H(f)}{\operatorname{argmin}} \sum_{i=0}^n \lambda^{n-i} \|\{Z(f)\}_i - \{S(f)\}_i \{H(f)\}_i\|^2,$$

to calculate a fourth substitution formula:

$$\hat{H}(f) = \left[ \sum_{i=0}^n \lambda^{n-i} \{S^H(f)\}_i \{S(f)\}_i \right]^{-1} \left[ \sum_{i=0}^n \lambda^{n-i} \{S^H(f)\}_i \{Z(f)\}_i \right],$$

where $0 < \lambda < 1$, $$\{Z(f)\}_i = \begin{bmatrix} \{Z(f)\}_i \\ \{Z(f)\}_{i+1} \\ M \\ \{Z(f)\}_{i+N-1} \end{bmatrix},$$

$$\{S(f)\}_i = \begin{bmatrix} \{S(f)\}_i & \{S'(f)\}_i \\ \{S(f)\}_{i+1} & \{S'(f)\}_{i+1} \\ \vdots & \vdots \\ \{S(f)\}_{i+N-1} & \{S'(f)\}_{i+N-1} \end{bmatrix},$$

$S^H(f)$ is a conjugate transpose matrix of S(f), and $$\hat{H}(f) = \begin{bmatrix} \hat{H}_1(f) \\ \hat{H}_2(f) \end{bmatrix};$$

and the fourth estimation subunit is specifically configured to calculate $\hat{H}_1(f)$ and $\hat{H}_2(f)$ with reference to the fourth substitution formula:

$$\hat{H}(f) = \left[ \sum_{i=0}^n \lambda^{n-i} \{S^H(f)\}_i \{S(f)\}_i \right]^{-1} \left[ \sum_{i=0}^n \lambda^{n-i} \{S^H(f)\}_i \{Z(f)\}_i \right]$$

calculated by the third estimation subunit and $$\hat{H}(f) = \begin{bmatrix} \hat{H}_1(f) \\ \hat{H}_2(f) \end{bmatrix}.$$

With reference to the first aspect or any implementation manner of the first to sixth possible implementation manners, in a seventh possible implementation manner, the reconstruction unit is specifically configured to calculate $\hat{Z}(f)$ according to a fifth formula:

$$\hat{Z}(f)=\hat{H}_1(f)S(f)+\hat{H}_2(f)S^*(-f),$$

so that the signal processing apparatus performs self-interference cancellation on the frequency-domain baseband signal, where $\hat{Z}(f)$ is a self-interference signal, $\hat{H}_1(f)$ is the estimated value of the first comprehensive response that is estimated by the estimation unit, $\hat{H}_2(f)$ is the estimated value of the second comprehensive response that is estimated by the estimation unit, $S(f)$ is the basic frequency-domain reference signal obtained by the transformation unit, and $S^*(-f)$ is the image frequency-domain reference signal obtained by the transformation unit.

According to a second aspect, a signal processing apparatus is provided, including a receiver, a processor, a memory, and a bus, where the receiver, the processor, and the memory are interconnected by using the bus. The receiver is configured to acquire a digital baseband reference signal, a self-interference reference signal, and a frequency-domain baseband signal. The processor is configured to obtain a basic reference signal and an image reference signal according to the digital baseband reference signal acquired by the receiver, where the image reference signal is an image signal of the basic reference signal. The processor is further configured to estimate an estimated value of a first comprehensive response and an estimated value of a second comprehensive response according to the basic reference signal obtained by the processor, the image reference signal obtained by the processor, and the self-interference reference signal acquired by the receiver. Additionally, the processor is configured to calculate a self-interference signal according to the estimated value of the first comprehensive response that is estimated by the processor, the estimated value of the second comprehensive response that is estimated by the processor, the basic reference signal obtained by the processor, and the image reference signal obtained by the processor, so that the signal processing apparatus performs self-interference cancellation on the frequency-domain baseband signal acquired by the receiver.

With reference to the second aspect, in a first possible implementation manner, the basic reference signal includes a basic frequency-domain reference signal; the image reference signal includes an image frequency-domain reference signal; the first comprehensive response includes a first comprehensive frequency-domain response; the second comprehensive response includes a second comprehensive frequency-domain response; and the self-interference reference signal includes a frequency-domain self-interference reference signal; and the processor is specifically configured to estimate an estimated value $\hat{H}_1(f)$ of $H_1(f)$ and an estimated value $\hat{H}_2(f)$ of $H_2(f)$ according to a first formula:

$$Z(f)=H_1(f)S(f)+H_2(f)S^*(-f),$$

where $S(f)$ is the basic frequency-domain reference signal obtained by the processor, $S^*(-f)$ is the image frequency-domain reference signal obtained by the processor, $Z(f)$ is the frequency-domain self-interference reference signal acquired by the receiver, $H_1(f)$ is the first comprehensive frequency-domain response, $\hat{H}_1(f)$ is the estimated value of the first comprehensive frequency-domain response $H_1(f)$, $H_2(f)$ is the second comprehensive frequency-domain response, and $\hat{H}_2(f)$ is the estimated value of the second comprehensive frequency-domain response $H_2(f)$.

With reference to the second aspect, in a second possible implementation manner, the basic reference signal includes a basic time-domain reference signal; the image reference signal includes an image time-domain reference signal; the first comprehensive response includes a first comprehensive time-domain response; the second comprehensive response includes a second comprehensive time-domain response; and the self-interference reference signal includes a time-domain self-interference reference signal; and the processor is specifically configured to estimate an estimated value $\hat{H}_1(f)$ of $H_1(f)$ and an estimated value $\hat{H}_2(f)$ of $H_2(f)$ according to a first substitution formula:

$$Z(t)=H_1(t)\otimes S(t)+H_2(t)\otimes S^*(-t),$$

where $s(t)$ is the basic time-domain reference signal obtained by the processor, $s^*(-t)$ is the image time-domain reference signal obtained by the processor, $Z(t)$ is the time-domain self-interference reference signal acquired by the receiver, $H_1(t)$ is the first comprehensive time-domain response, and $H_2(t)$ is the second comprehensive time-domain response, where $H_1(f)$ is a Fourier transform value of $H_1(t)$, and $H_2(f)$ is a Fourier transform value of $H_2(t)$; and $Z(f)$ is a Fourier transform value of $Z(t)$.

With reference to the first possible implementation manner of the second aspect, in a third possible implementation manner, the processor being specifically configured to estimate an estimated value $\hat{H}_1(f)$ of $H_1(f)$ and an estimated value $\hat{H}_2(f)$ of $H_2(f)$ according to a first formula:

$$Z(f)=H_1(f)S(f)+H_2(f)S^*(-f)$$

includes: the processor being specifically configured to acquire a second formula:

$$\{Z(f)\}_i=H_1(f)\{S(f)\}_i+H_2(f)\{S'(f)\}_i$$

according to the first formula:

$$Z(f)=H_1(f)S(f)+H_2(f)S^*(-f),$$

where the second formula is a relational expression about $S(f)$ and $S^*(-f)$ of the $i^{th}$ frame that are acquired by the processor and $Z(f)$ of the $i^{th}$ frame that is acquired by the receiver, and $S'(f)=S^*(-f)$; the processor is further configured to substitute $S(f)$ and $S^*(-f)$, acquired by the processor, of N frames from the $i^{th}$ frame and $Z(f)$, acquired by the receiver, of the N frames from the $i^{th}$ frame into the second formula:

$$\{Z(f)\}_i=H_1(f)\{S(f)\}_i+H_2(f)\{S'(f)\}_i$$

acquired by the processor, to calculate an $N^{th}$-order system of linear equations:

$Z(f)=S(f)H(f)$, where $$Z(f) = \begin{bmatrix} \{Z(f)\}_i \\ \{Z(f)\}_{i+1} \\ M \\ \{Z(f)\}_{i+N-1} \end{bmatrix},$$

$$S(f) = \begin{bmatrix} \{S(f)\}_i & \{S'(f)\}_i \\ \{S(f)\}_{i+1} & \{S'(f)\}_{i+1} \\ \vdots & \vdots \\ \{S(f)\}_{i+N-1} & \{S'(f)\}_{i+N-1} \end{bmatrix}, \text{ and } H(f) = \begin{bmatrix} H_1(f) \\ H_2(f) \end{bmatrix};$$

the processor is further configured to calculate, according to the matrices $Z(f)$, $S(f)$, and $H(f)$ calculated by the processor, an expression for expressing a relationship among Z(f), S(f), and Ĥ(f), where Ĥ(f) is an estimated value matrix of H(f), and $$\hat{H}(f) = \begin{bmatrix} \hat{H}_1(f) \\ \hat{H}_2(f) \end{bmatrix};$$

and the processor is further configured to calculate $\hat{H}_1(f)$ and $\hat{H}_2(f)$ with reference to the expression for expressing the relationship among Z(f), S(f), and Ĥ(f) that is calculated by the processor and $$\hat{H}(f) = \begin{bmatrix} \hat{H}_1(f) \\ \hat{H}_2(f) \end{bmatrix}.$$

With reference to the second possible implementation manner of the second aspect, in a fourth possible implementation manner, the processor being specifically configured to estimate an estimated value $\hat{H}_1(f)$ of $H_1(f)$ and an estimated value of $\hat{H}_2(f)$ of $H_2(f)$ according to a first substitution formula:

$$Z(t) = H_1(t) \otimes S(t) + H_2(t) \otimes S^*(-t)$$

includes: the processor being specifically configured to acquire a second formula:

$$\{Z(f)\}_i = H_1(f)\{S(f)\}_i + H_2(f)\{S'(f)\}_i$$

according to the first substitution formula:

$$Z(t) = H_1(t) \otimes S(t) + H_2(t) \otimes S^*(-t),$$

where the second formula is a relational expression about S(f) and S*(−f) of the $i^{th}$ frame that are acquired by the processor and Z(f) of the $i^{th}$ frame that is acquired by the receiver, and S'(f)=S*(−f): the processor is further configured to substitute S(f) and S*(−f), acquired by the processor, of N frames from the $i^{th}$ frame and Z(f), acquired by the receiver, of the N frames from the $i^{th}$ frame into the second formula:

$$\{Z(f)\}_i = H_1(f)\{S(f)\}_i + H_2(f)\{S'(f)\}_i$$

acquired by the processor, to calculate an $N^{th}$-order system of linear equations:

$$Z(f) = S(f)H(f),$$

where $$Z(f) = \begin{bmatrix} \{Z(f)\}_i \\ \{Z(f)\}_{i+1} \\ M \\ \{Z(f)\}_{i+N-1} \end{bmatrix},$$

$$S(f) = \begin{bmatrix} \{S(f)\}_i & \{S'(f)\}_i \\ \{S(f)\}_{i+1} & \{S'(f)\}_{i+1} \\ \vdots & \vdots \\ \{S(f)\}_{i+N-1} & \{S'(f)\}_{i+N-1} \end{bmatrix}, \text{ and } H(f) = \begin{bmatrix} H_1(f) \\ H_2(f) \end{bmatrix};$$

the processor is further configured to calculate, according to the matrices Z(f), and S(f), and H(f) calculated by the processor, an expression for expressing a relationship among z(f), S(f), and Ĥ(f), where Ĥ(f) is an estimated value matrix of H(f), and $$\hat{H}(f) = \begin{bmatrix} \hat{H}_1(f) \\ \hat{H}_2(f) \end{bmatrix};$$

and the processor is further configured to calculate $\hat{H}_1(f)$ and $\hat{H}_2(f)$ with reference to the expression for expressing the relationship among Z(f), S(f), and Ĥ(f) that is calculated by the processor and $$\hat{H}(f) = \begin{bmatrix} \hat{H}_1(f) \\ \hat{H}_2(f) \end{bmatrix}.$$

With reference to the third or fourth possible implementation manner of the second aspect, in a fifth possible implementation manner, the processor is specifically configured to substitute the matrices Z(f), S(f), and H(f) calculated by the processor into a third formula:

$$\hat{H}(f) = \underset{H(f)}{\operatorname{argmin}} \| Z(f) - S(f)H(f) \|^2,$$

to calculate a fourth formula $$\hat{H}(f) = [S^H(f)S(f)]^{-1}S^H(f)Z(f),$$

where $S^H$ is a conjugate transpose matrix of S(f), and $$\hat{H}(f) = \begin{bmatrix} \hat{H}_1(f) \\ \hat{H}_2(f) \end{bmatrix};$$

and the processor is further specifically configured to calculate $\hat{H}_1(f)$ and $\hat{H}_2(f)$ with reference to the fourth formula:

$$\hat{H}(f) = [S^H(f)S(f)]^{-1}S^H(f)Z(f)$$

calculated by the processor and $$\hat{H}(f) = \begin{bmatrix} \hat{H}_1(f) \\ \hat{H}_2(f) \end{bmatrix}.$$

With reference to the third or fourth possible implementation manner of the second aspect, in a sixth possible implementation manner, the processor is specifically configured to substitute the matrices Z(f), S(f) and H(f) calculated by the processor into a third substitution formula:

$$\hat{H}(f) = \underset{H(f)}{\operatorname{argmin}} \sum_{i=0}^{n} \lambda^{n-i} \|\{Z(f)\}_i - \{S(f)\}_i \{H(f)\}_i\|^2,$$

to calculate a fourth substitution formula:

$$\hat{H}(f) = \left[ \sum_{i=0}^{n} \lambda^{n-i} \{S^H(f)\}_i \{S(f)\}_i \right]^{-1} \left[ \sum_{i=0}^{n} \lambda^{n-i} \{S^H(f)\}_i \{S(f)\}_i \right],$$

where $0<\lambda<1$, $$\{Z(f)\}_i = \begin{bmatrix} \{Z(f)\}_i \\ \{Z(f)\}_{i+1} \\ M \\ \{Z(f)\}_{i+N-1} \end{bmatrix},$$

$$\{S(f)\}_i = \begin{bmatrix} \{S(f)\}_i & \{S'(f)\}_i \\ \{S(f)\}_{i+1} & \{S'(f)\}_{i+1} \\ \vdots & \vdots \\ \{S(f)\}_{i+N-1} & \{S'(f)\}_{i+N-1} \end{bmatrix},$$

$S^H(f)$ is a conjugate transpose matrix of $S(f)$, and $$\hat{H}(f) = \begin{bmatrix} \hat{H}_1(f) \\ \hat{H}_2(f) \end{bmatrix};$$

and the processor is further specifically configured to calculate $\hat{H}_1(f)$ and $\hat{H}_1(f)$ with reference to the fourth substitution formula:

$$\hat{H}(f) = \left[\sum_{i=0}^{n} \lambda^{n-i}\{S^H(f)\}_i\{S(f)\}_i\right]^{-1}\left[\sum_{i=0}^{n} \lambda^{n-i}\{S^H(f)\}_i\{Z(f)\}_i\right]$$

calculated by the processor and $$\hat{H}(f) = \begin{bmatrix} \hat{H}_1(f) \\ \hat{H}_2(f) \end{bmatrix}.$$

With reference to the second aspect or any implementation manner of the first to sixth possible implementation manners, in a seventh possible implementation manner, the processor is further specifically configured to calculate $\hat{Z}(f)$ according to a fifth formula:

$$\hat{Z}(f) = \hat{H}_1(f)S(f) + \hat{H}_2(f)S^*(-f),$$

so that the signal processing apparatus performs self-interference cancellation on the frequency-domain baseband signal, where $\hat{A}(f)$ is a frequency-domain self-interference signal, $\hat{H}_1(f)$ is the estimated value of the first comprehensive frequency-domain response that is estimated by the processor, $\hat{H}_2(f)$ is the estimated value of the second comprehensive frequency-domain response that is estimated by processor, $S(f)$ is the basic frequency-domain reference signal obtained by the processor, and $S^*(-f)$ is the image frequency-domain reference signal obtained by the processor.

According to a third aspect, a signal processing method is provided, including: acquiring, by a signal processing apparatus, a digital baseband reference signal, a self-interference reference signal, and a frequency-domain baseband signal; obtaining, by the signal processing apparatus, a basic reference signal and an image reference signal according to the digital baseband reference signal, where the image reference signal is an image signal of the basic reference signal; estimating, by the signal processing apparatus, an estimated value of a first comprehensive response and an estimated value of a second comprehensive response according to the basic reference signal, the image reference signal, and the self-interference reference signal; and calculating, by the signal processing apparatus, a self-interference signal according to the estimated value of the first comprehensive response, the estimated value of the second comprehensive response, the basic reference signal, and the image reference signal, so that the signal processing apparatus performs self-interference cancellation on the frequency-domain baseband signal.

With reference to the third aspect, in a first possible implementation manner, the estimating, by the signal processing apparatus, an estimated value of a first comprehensive response and an estimated value of a second comprehensive response according to the basic frequency-domain reference signal, the image frequency-domain reference signal, and the self-interference reference signal includes: the basic reference signal includes a basic frequency-domain reference signal; the image reference signal includes an image frequency-domain reference signal; the first comprehensive response includes a first comprehensive frequency-domain response; the second comprehensive response includes a second comprehensive frequency-domain response; and the self-interference reference signal includes a frequency-domain self-interference reference signal; and estimating, by the signal processing apparatus, an estimated value $\hat{H}_1(f)$ of $H_1(f)$ and an estimated value $\hat{H}_2(f)$ of $H_2(f)$ according to a first formula:

$$Z(f) = H_1(f)S(f) + H_2(f)S^*(-f),$$

where $S(f)$ is the basic frequency-domain reference signal, $S^*(-f)$ is the image frequency-domain reference signal, $Z(f)$ is the frequency-domain self-interference reference signal, $H_1(f)$ is the first comprehensive frequency-domain response, $\hat{H}_1(f)$ is the estimated value of the first comprehensive frequency-domain response $H_1(f)$, $H_2(f)$ is the second comprehensive frequency-domain response, and $\hat{H}_2(f)$ is the estimated value of the second comprehensive frequency-domain response $H_2(f)$.

With reference to the third aspect, in a second possible implementation manner, the estimating, by the signal processing apparatus, an estimated value of a first comprehensive response and an estimated value of a second comprehensive response according to the basic frequency-domain reference signal, the image frequency-domain reference signal, and the self-interference reference signal includes: the basic reference signal includes a basic time-domain reference signal; the image reference signal includes an image time-domain reference signal; the first comprehensive response includes a first comprehensive time-domain response; the second comprehensive response includes a second comprehensive time-domain response; and the self-interference reference signal includes a time-domain self-interference reference signal; and estimating, by the signal processing apparatus, an estimated value $\hat{H}_1(f)$ of $H_1(f)$ and an estimated value $\hat{H}_2(f)$ of $H_2(f)$ according to a first substitution formula:

$$Z(t) = H_1(t) \otimes S(t) + H_2(t) \otimes S^*(-t),$$

where $s(t)$ is the basic time-domain reference signal, $s^*(-t)$ is the image time-domain reference signal, $Z(t)$ is the time-domain self-interference reference signal acquired by the acquiring unit, $H_1(t)$ is the first comprehensive time-domain response, and $H_2(t)$ is the second comprehensive time-domain response, where $H_1(f)$ is a Fourier transform value of $H_1(t)$, and $H_2(f)$ is a Fourier transform value of $H_2(t)$; and $Z(f)$ is a Fourier transform value of $Z(t)$.

With reference to the first possible implementation manner of the third aspect, in a third possible implementation manner, the estimating, by the signal processing apparatus, an estimated value $\hat{H}_1(f)$ of $H_1(f)$ and an estimated value $\hat{H}_2(f)$ of $H_2(f)$ according to a first formula:

$$Z(f)=H_1(f)S(f)+H_2(f)S^*(-f)$$

includes: acquiring, by the signal processing apparatus, a second formula:

$$\{Z(f)\}_i=H_1(f)\{S(f)\}_i+H_2(f)\{S'(f)\}_i$$

according to the first formula:

$$Z(f)=H_1(f)S(f)+H_2(f)S^*(-f),$$

where the second formula is a relational expression about S(f), S*(−f), and Z(f) of the $i^{th}$ frame that are acquired by the signal processing apparatus, and S'(f)=S'(−f); successively substituting S(f), S'(−f), and Z(f), acquired by the signal processing apparatus, of N frames from the $i^{th}$ frame into the second formula:

$$\{Z(f)\}_i=H_1(f)\{S(f)\}_i+H_2(f)\{S'(f)\}_i$$

to calculate an $N^{th}$-order system of linear equations:

$$Z(f)=S(f)H(f), \text{ where}$$

$$Z(f) = \begin{bmatrix} \{Z(f)\}_i \\ \{Z(f)\}_{i+1} \\ \vdots \\ \{Z(f)\}_{i+N-1} \end{bmatrix},$$

$$S(f) = \begin{bmatrix} \{S(f)\}_i & \{S'(f)\}_i \\ \{S(f)\}_{i+1} & \{S'(f)\}_{i+1} \\ \vdots & \vdots \\ \{S(f)\}_{i+N-1} & \{S'(f)\}_{i+N-1} \end{bmatrix}, \text{ and}$$

$$H(f) = \begin{bmatrix} H_1(f) \\ H_2(f) \end{bmatrix};$$

calculating, by the signal processing apparatus according to the matrices Z(f), S(f), and H(f), an expression for expressing a relationship among Z(f), S(f), and $\hat{H}(f)$, where $\hat{H}(f)$ is an estimated value matrix of H(f), and $$\hat{H}(f) = \begin{bmatrix} \hat{H}_1(f) \\ \hat{H}_2(f) \end{bmatrix};$$

and calculating, by the signal processing apparatus, $\hat{H}_1(f)$ and $\hat{H}_2(f)$ with reference to the expression for expressing the relationship among Z(f), S(f), $\hat{H}(f)$, and $$\hat{H}(f) = \begin{bmatrix} \hat{H}_1(f) \\ \hat{H}_2(f) \end{bmatrix}.$$

With reference to the second possible implementation manner of the third aspect, in a fourth possible implementation manner, the estimating, by the signal processing apparatus, an estimated value $\hat{H}_1(f)$ of $H_1(f)$ and an estimated value $\hat{H}_2(f)$ of $H_2(f)$ according to a first substitution formula:

$$Z(t)=H_1(t) \otimes S(t)+H_2(t) \otimes S^*(-t)$$

includes: acquiring, by the signal processing apparatus, a second formula:

$$\{Z(f)\}_i=H_1(f)\{S(f)\}_i+H_2(f)\{S'(f)\}_i$$

according to the first substitution formula:

$$Z(t)=H_1(t) \otimes S(t)+H_2(t) \otimes S^*(-t),$$

where the second formula is a relational expression about S(f), S*(−f), and Z(f) of the $i^{th}$ frame that are acquired by the signal processing apparatus, and S'(f)=S*(−f); successively substituting S(f), S*(−f), and Z(f), acquired by the signal processing apparatus, of N frames from the $i^{th}$ frame into the second formula:

$$\{Z(f)\}_i=H_1(f)\{S(f)\}_i+H_2(f)\{S'(f)\}_i,$$

to calculate an $N^{th}$-order system of linear equations Z(f)=S(f)H(f), where $$Z(f) = \begin{bmatrix} \{Z(f)\}_i \\ \{Z(f)\}_{i+1} \\ \vdots \\ \{Z(f)\}_{i+N-1} \end{bmatrix},$$

$$S(f) = \begin{bmatrix} \{S(f)\}_i & \{S'(f)\}_i \\ \{S(f)\}_{i+1} & \{S'(f)\}_{i+1} \\ \vdots & \vdots \\ \{S(f)\}_{i+N-1} & \{S'(f)\}_{i+N-1} \end{bmatrix}, \text{ and}$$

$$H(f) = \begin{bmatrix} H_1(f) \\ H_2(f) \end{bmatrix};$$

calculating, by the signal processing apparatus according to the matrices Z(f), S(f), and H(f), an expression for expressing a relationship among Z(f), S(f), and $\hat{H}(f)$, where $\hat{H}(f)$ is an estimated value matrix of H(f), and $$\hat{H}(f) = \begin{bmatrix} \hat{H}_1(f) \\ \hat{H}_2(f) \end{bmatrix};$$

and calculating, by the signal processing apparatus, $\hat{H}_1(f)$ and $\hat{H}_2(f)$ with reference to the expression for expressing the relationship among Z(f), S(f), $\hat{H}(f)$, and $$\hat{H}(f) = \begin{bmatrix} \hat{H}_1(f) \\ \hat{H}_2(f) \end{bmatrix}.$$

With reference to the third or fourth possible implementation manner of the third aspect, in a fifth possible implementation manner, the calculating, by the signal processing apparatus according to the matrices Z(f), S(f), and H(f), an expression for expressing a relationship among Z(f), S(f), and $\hat{H}(f)$, where $\hat{H}(f)$ is an estimated value matrix of H(f), and $$\hat{H}(f) = \begin{bmatrix} \hat{H}_1(f) \\ \hat{H}_2(f) \end{bmatrix},$$

specifically includes: substituting, by the signal processing apparatus, the matrices Z(f), S(f), and H(f) into a third formula:

$$\hat{H}(f) = \underset{H(f)}{\arg\min} \|Z(f) - S(f)H(f)\|^2,$$

to calculate a fourth formula:

$$\hat{H}(f) = [S^H(f)S(f)]^{-1}S^H(f)Z(f),$$

where $S^H(f)$ is a conjugate transpose matrix of S(f), and $$\hat{H}(f) = \begin{bmatrix} \hat{H}_1(f) \\ \hat{H}_2(f) \end{bmatrix};$$

and the calculating, by the signal processing apparatus, $\hat{H}_1(f)$ and $\hat{H}_2(f)$ with reference to the expression for expressing the relationship among Z(f), S(f), $\hat{H}(f)$, and $$\hat{H}(f) = \begin{bmatrix} \hat{H}_1(f) \\ \hat{H}_2(f) \end{bmatrix}$$

specifically includes: calculating, by the signal processing apparatus, $\hat{H}_1(f)$ and $\hat{H}_2(f)$ with reference to the fourth formula:

$$\hat{H}(f) = [S^H(f)S(f)]^{-1}S^H(f)Z(f) \text{ and}$$

$$\hat{H}(f) = \begin{bmatrix} \hat{H}_1(f) \\ \hat{H}_2(f) \end{bmatrix}.$$

With reference to the third or fourth possible implementation manner of the third aspect, in a sixth possible implementation manner, the calculating, by the signal processing apparatus according to the matrices Z(f), S(f), and H(f), an expression for expressing a relationship among Z(f), S(f), and $\hat{H}(f)$, where $\hat{H}(f)$ is an estimated value matrix of H(f), and $$\hat{H}(f) = \begin{bmatrix} \hat{H}_1(f) \\ \hat{H}_2(f) \end{bmatrix},$$

specifically includes: substituting, by the signal processing apparatus, the matrices, Z(f), S(f), and H(f) into a third substitution formula:

$$\hat{H}(f) = \underset{H(f)}{\arg\min} \sum_{i=0}^{n} \lambda^{n-i} \|\{Z(f)\}_i - \{S(f)\}_i\{H(f)\}_i\|^2,$$

to calculate a fourth substitution formula:

$$\hat{H}(f) = \left[\sum_{i=0}^{n} \lambda^{n-i}\{S^H(f)\}_i\{S(f)\}_i\right]^{-1}\left[\sum_{i=0}^{n} \lambda^{n-i}\{S^H(f)\}_i\{Z(f)\}_i\right],$$

where $0 < \lambda < 1$, $$\{Z(f)\}_i = \begin{bmatrix} \{Z(f)\}_i \\ \{Z(f)\}_{i+1} \\ M \\ \{Z(f)\}_{i+N-1} \end{bmatrix},$$

$$\{S(f)\}_i = \begin{bmatrix} \{S(f)\}_i & \{S'(f)\}_i \\ \{S(f)\}_{i+1} & \{S'(f)\}_{i+1} \\ \vdots & \vdots \\ \{S(f)\}_{i+N-1} & \{S'(f)\}_{i+N-1} \end{bmatrix},$$

$S^H(f)$ is s a conjugate transpose matrix of S(f), and $$\hat{H}(f) = \begin{bmatrix} \hat{H}_1(f) \\ \hat{H}_2(f) \end{bmatrix};$$

and the calculating, by the signal processing apparatus, $\hat{H}_1(f)$ and $\hat{H}_2(f)$ with reference to the expression for expressing the relationship among Z(f), S(f), $\hat{H}(f)$, and $$\hat{H}(f) = \begin{bmatrix} \hat{H}_1(f) \\ \hat{H}_2(f) \end{bmatrix}$$

specifically includes: calculating, by the signal processing apparatus, $\hat{H}_1(f)$ and $\hat{H}_2(f)$ with reference to the fourth substitution formula:

$$\hat{H}(f) = \left[\sum_{i=0}^{n} \lambda^{n-i}\{S^H(f)\}_i\{S(f)\}_i\right]^{-1}\left[\sum_{i=0}^{n} \lambda^{n-i}\{S^H(f)\}_i\{Z(f)\}_i\right] \text{ and}$$

$$\hat{H}(f) = \begin{bmatrix} \hat{H}_1(f) \\ \hat{H}_2(f) \end{bmatrix}.$$

With reference to the third aspect or any implementation manner of the first to sixth possible implementation manners, in a seventh possible implementation manner, the calculating, by the signal processing apparatus, a self-interference signal according to the first comprehensive response, the second comprehensive response, the basic frequency-domain reference signal, and the image frequency-domain reference signal, so that the signal processing apparatus performs self-interference cancellation on the frequency-domain baseband signal, includes: calculating, by the signal processing apparatus, $\hat{Z}(f)$ according to a fifth formula:

$$\hat{A}(f) = \hat{H}_1(f)S(f) + \hat{H}_2(f)S^*(-f),$$

so that the signal processing apparatus performs self-interference cancellation on the frequency-domain baseband signal, where $\hat{Z}(f)$ is a frequency-domain self-interference signal, $\hat{H}_1(f)$ is the estimated value of the first comprehensive frequency-domain response, $\hat{H}_2(f)$ is the estimated value of the second comprehensive frequency-domain response, S(f) is the basic frequency-domain reference signal, and $S^*(-f)$ is the image frequency-domain reference signal.

According to the signal processing method and apparatus provided in the embodiments, a self-interference signal affected by IQ imbalance can be calculated and used for self-interference cancellation, so as to implement self-interference cancellation when IQ imbalance exists in a communications system, which improves digital interference cancellation performance.

BRIEF DESCRIPTION OF THE DRAWINGS

For a more complete understanding of embodiments, and the advantages thereof, reference is now made to the following descriptions taken in conjunction with the accompanying drawings, in which.

DETAILED DESCRIPTION OF ILLUSTRATIVE EMBODIMENTS

A signal processing apparatus in the embodiments may be disposed on or is an access terminal that uses a wireless full-duplex technology. The access terminal may also be referred to as a system, a subscriber unit, a subscriber station, a mobile station, a remote station, a remote terminal, a mobile device, a user terminal, a terminal, a wireless communications device, a user agent, a user apparatus, or user equipment (UE). The access terminal may be a cellular phone, a cordless phone, a SIP (Session Initiation Protocol) phone, a WLL (Wireless Local Loop) station, a PDA (Personal Digital Assistant), or a handheld device, a vehicle-mounted device, a wearable device, or a computation device having a wireless communications function, or another processing device connected to a wireless modem.

In addition, the signal processing apparatus in the embodiments may also be disposed on or is a base station that uses a wireless full-duplex technology. The base station may be configured to communicate with a mobile device, and the base station may be a WiFi AP (Access Point), or a BTS (Base Transceiver Station) in GSM (Global System for Mobile communications) or CDMA (Code Division Multiple Access), or may be an NB (NodeB) in WCDMA (Wideband Code Division Multiple Access), or may be eNB or eNodeB (Evolved NodeB) in LTE (Long Term Evolution), a relay station, an access point, a base station device in a future 5G network, or the like.

Figure 1:
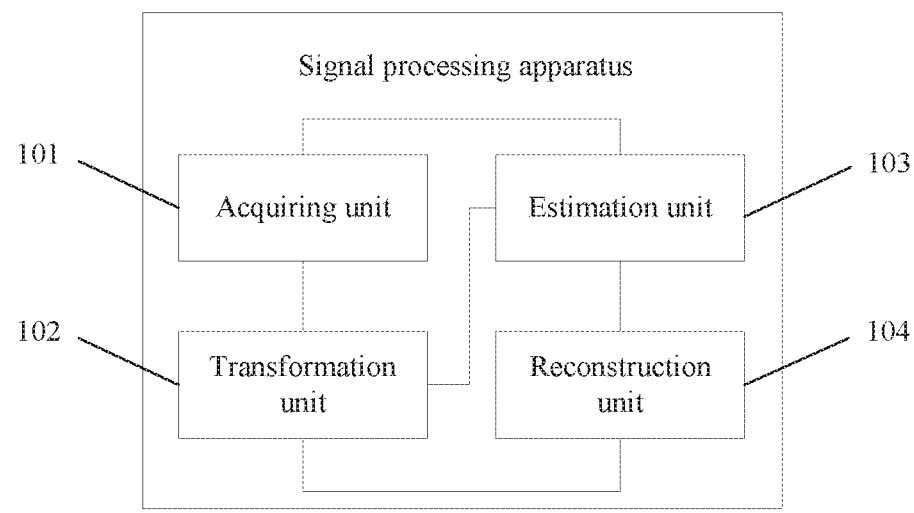
FIG. 1 is a schematic structural diagram of a signal processing apparatus according to an embodiment.

An embodiment provides a signal processing apparatus. As shown in FIG. 1, the signal processing apparatus is configured to implement self-interference cancellation in the field of communications and includes the following structure: an acquiring unit 101, a transformation unit 102, an estimation unit 103, and a reconstruction unit 104.

The acquiring unit 101 is configured to acquire a digital baseband reference signal, a self-interference reference signal, and a frequency-domain baseband signal.

The self-interference reference signal includes a frequency-domain self-interference reference signal or a time-domain self-interference reference signal.

The transformation unit 102 is configured to obtain a basic reference signal and an image reference signal according to the digital baseband reference signal acquired by the acquiring unit 101.

The image reference signal is an image signal of the basic reference signal. The basic reference signal includes at least one of a basic frequency-domain reference signal or a basic time-domain reference signal, and the image reference signal includes at least one of an image frequency-domain reference signal or an image time-domain reference signal.

The estimation unit 103 is configured to estimate an estimated value of a first comprehensive response and an estimated value of a second comprehensive response according to the basic reference signal obtained by the transformation unit 102, the image reference signal obtained by the transformation unit 102, and the self-interference reference signal acquired by the acquiring unit 101.

The first comprehensive response includes at least one of a first comprehensive frequency-domain response or a first comprehensive time-domain response, the second comprehensive response includes at least one of a second comprehensive frequency-domain response or a second comprehensive time-domain response, and the self-interference reference signal includes at least one of the frequency-domain self-interference reference signal or the time-domain self-interference reference signal.

Optionally, the estimation unit 103 may be configured to estimate an estimated value $\hat{H}_1(f)$ of $H_1(f)$ and an estimated value $\hat{H}_2(f)$ of $H_2(f)$ according to a first formula:

$$Z(f)=H_1(f)S(f)+H_2(f)S^*(-f),$$

where $S(f)$ is the basic frequency-domain reference signal obtained by the transformation unit 102, $S^*(-f)$ is the image frequency-domain reference signal obtained by the transformation unit 102, $Z(f)$ is the frequency-domain self-interference reference signal acquired by the acquiring unit 101, $H_1(f)$ is the first comprehensive frequency-domain response, $\hat{H}_1(f)$ is the estimated value of the first comprehensive frequency-domain response $H_1(f)$, $H_2(f)$ is the second comprehensive frequency-domain response, and $\hat{H}_2(f)$ is the estimated value of the second comprehensive frequency-domain response $H_2(f)$.

Specifically, when the transformation unit 102 obtains the basic frequency-domain reference signal $S(f)$, the transformation unit 102 obtains the image frequency-domain reference signal $S^*(-f)$, and the acquiring unit 101 acquires the frequency-domain self-interference reference signal $Z(f)$, the estimation unit 103 can estimate the estimated value $\hat{H}_1(f)$ of $H_1(f)$ and the estimated value $\hat{H}_2(f)$ of $H_2(f)$ according to the first formula:

$$Z(f)=H_1(f)S(f)+H_2(f)S^*(-f),$$

Optionally, the estimation unit 103 may be further configured to estimate an estimated value $\hat{H}_1(f)$ of $H_1(f)$ and an estimated value $\hat{H}_2(f)$ of $H_2(f)$ according to a first substitution formula:

$$Z(t)=H_1(t)\otimes S(t)+H_2(t)\otimes S^*(-t),$$

where $s(t)$ is the basic time-domain reference signal obtained by the transformation unit 102, $s^*(-t)$ is the image time-domain reference signal obtained by the transformation unit 102, $Z(t)$ is the time-domain self-interference reference signal acquired by the acquiring unit 101, $H_1(t)$ is the first comprehensive time-domain response, and $H_2(t)$ is the second comprehensive time-domain response, where $H_1(f)$ may be a Fourier transform value of $H_1(t)$, $H_2(f)$ may be a Fourier transform value of $H_2(t)$, and $\otimes$ represents convolution; and $H_1(f)$ is a first comprehensive frequency-domain response, $\hat{H}_1(f)$ is an estimated value of the first comprehensive frequency-domain response $H_1(f)$, $H_2(f)$ is a second comprehensive frequency-domain response, and $\hat{H}_2(f)$ is an estimated value of the second comprehensive frequency-domain response $H_2(f)$.

Specifically, when the transformation unit 102 obtains the basic time-domain reference signal s(t), the transformation unit 102 obtains the image time-domain reference signal s*(−t), and the acquiring unit 101 acquires the time-domain self-interference reference signal Z(t), the estimation unit 103 can estimate the estimated value $\hat{H}_1(t)$ of $H_1(t)$ and the estimated value $\hat{H}_2(t)$ of $H_2(t)$ according to the first substitution formula:

$$Z(t)=H_1(t) \otimes S(t)+H_2(t) \otimes S^*(-t),$$

$H_1(t)$ may be a time-domain expression form corresponding to $H_1(f)$, and $H_2(t)$ may be a time-domain expression form corresponding to $H_2(f)$. Correspondingly, $\hat{H}_1(t)$ may be a time-domain expression form corresponding to $\hat{H}_1(f)$, and $\hat{H}_2(t)$ may be a time-domain expression form corresponding to $\hat{H}_2(f)$. Therefore, Fourier transform may be performed on $\hat{H}_1(t)$ or a manner of Fourier series may be used, to obtain $\hat{H}_1(f)$, and Fourier transform may also be performed on $\hat{H}_2(t)$ or a manner of Fourier series may also be used, to obtain $\hat{H}_2(f)$.

When the foregoing signals are periodic signals, $\hat{H}_1(t)$ and $\hat{H}_2(t)$ are respectively transformed into $\hat{H}_1(f)$ and $\hat{H}_2(f)$ in the form of Fourier series; when the foregoing signals are non-periodic signals, $\hat{H}_1(t)$ and $\hat{H}_2(t)$ are respectively transformed into $\hat{H}_1(f)$ and $\hat{H}_2(f)$ by means of Fourier transform. In this case, the estimation unit 103 may further transform the first substitution formula into the first formula, perform frequency-domain transformation on s(t), s*(−t), and Z(t) separately to obtain S(f), S*(−f), and Z(f), and obtain $\hat{H}_1(f)$ and $\hat{H}_2(f)$ with reference to the first formula, where Z(f) may be a Fourier transform value of Z(t), and Z(f) is the frequency-domain self-interference reference signal.

Herein, it should be noted that, work content of the estimation unit 103 is not limited to the foregoing content, all other work content of estimating the estimated value $\hat{H}_1(f)$ of $H_1(f)$ and the estimated value $\hat{H}_2(f)$ of $H_2(f)$ according to the first formula:

$$Z(f)=H_1(f)S(f)+H_2(f)S^*(-f)$$

or the first substitution formula:

$$Z(t)=H_1(t) \otimes S(t)+H_2(t) \otimes S^*(-t)$$

can be implemented by the estimation unit 103, and all the work content can be covered in the embodiments.

The reconstruction unit 104 is configured to calculate a self-interference signal according to the estimated value of the first comprehensive response that is estimated by the estimation unit 103, the estimated value of the second comprehensive response that is estimated by the estimation unit 103, the basic reference signal obtained by the transformation unit 102, and the image reference signal obtained by the transformation unit 102, so that the signal processing apparatus performs self-interference cancellation on the frequency-domain baseband signal acquired by the acquiring unit 101.

Specifically, the reconstruction unit 104 may be configured to calculate $\hat{Z}(f)$ according to a fifth formula:

$$\hat{Z}(f)=\hat{H}_1(f)S(f)+\hat{H}_2(f)S^*(-f),$$

so that the signal processing apparatus performs self-interference cancellation on the frequency-domain is domain baseband signal, where $\hat{Z}(f)$ is a frequency-domain self-interference signal, $\hat{H}_1(f)$ is the estimated value of the first comprehensive frequency-domain response that is estimated by the estimation unit 103, $\hat{H}_2(f)$ is the estimated value of the second comprehensive frequency-domain response that is estimated by the estimation unit 103, S(f) is the basic frequency-domain reference signal obtained by the transformation unit 102, and S*(−f) is the image frequency-domain reference signal obtained by the transformation unit 102.

Figure 2:
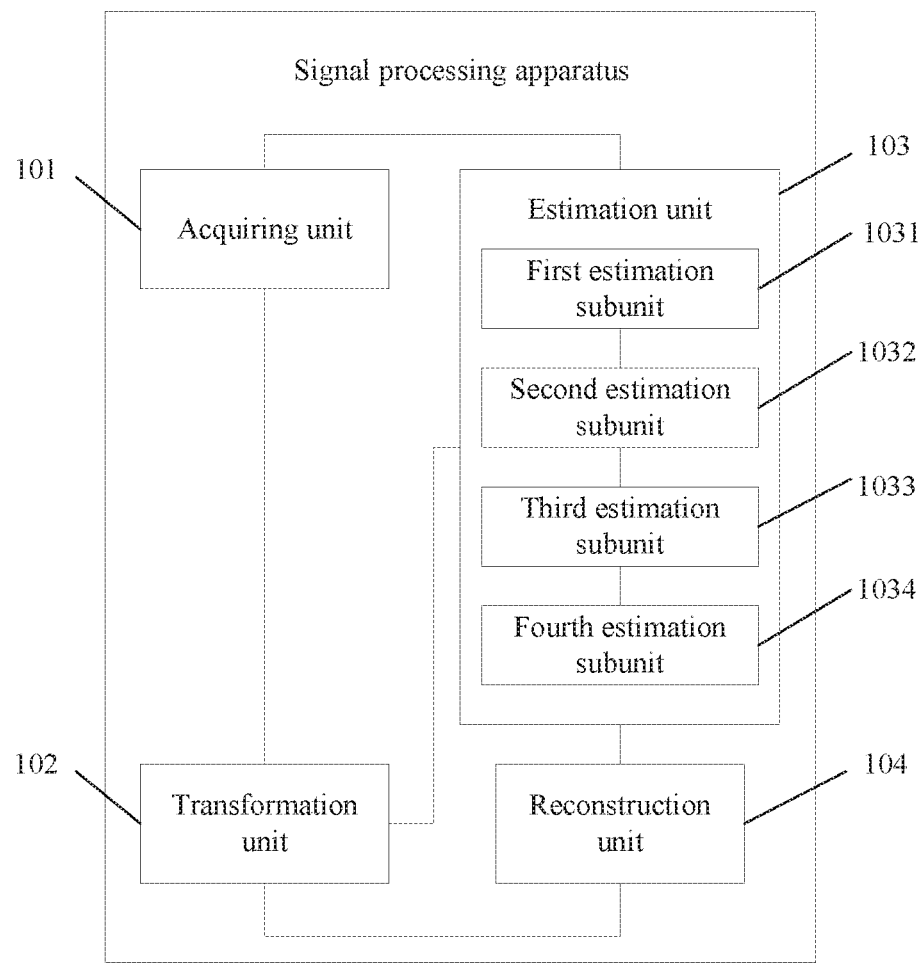
FIG. 2 is a schematic structural diagram of another signal processing apparatus according to an embodiment.

According to the foregoing description of the work content of the estimation unit 103, optionally, as shown in FIG. 2, the estimation unit 103 may include: a first estimation subunit 1031, a second estimation subunit 1032, a third estimation subunit 1033, and a fourth estimation subunit 1034.

The first estimation subunit 1031 is configured to acquire a second formula:

$$\{Z(f)\}_i=H_1(f)\{S(f)\}_i+H_2(f)\{S'(f)\}_i$$

according to the first formula:

$$Z(f)=H_1(f)S(f)+H_2(f)S^*(-f),$$

where the second formula is a relational expression about S(f) and S*(−f) of the $i^{th}$ frame that are acquired by the transformation unit 102 and Z(f) of the $i^{th}$ frame that is acquired by the acquiring unit 101, and S'(f)=S*(−f)

Specifically, when the transformation unit 102 obtains the basic frequency-domain reference signal S(f), the transformation unit 102 obtains the image frequency-domain reference signal S*(−f), and the acquiring unit 101 acquires the frequency-domain self-interference reference signal Z(f), the first estimation subunit 1031 can obtain the second formula:

$$\{Z(f)\}_i=H_1(f)\{S(f)\}_i+H_2(f)\{S'(f)\}_i$$

according to the first formula:

$$Z(f)=H_1(f)S(f)+H_2(f)S^*(-f).$$

More further, optionally, the first estimation subunit 1031 may be further configured to acquire a second formula:

$$\{Z(f)\}_i=H_1(f)\{S(f)\}_i+H_2(f)\{S'(f)\}_i$$

according to the first substitution formula:

$$Z(t)=H_1(t) \otimes S(t)+H_2(t) \otimes S^*(-t),$$

where Z(f) may be a Fourier transform value of Z(t), and Z(f) is the frequency-domain self-interference reference signal.

Specifically, when the transformation unit 102 obtains the basic time-domain reference signal s(t), the transformation unit 102 obtains the image time-domain reference signal s*(−t), and the acquiring unit 101 acquires the time-domain self-interference reference signal Z(t), the first estimation subunit 1031 may also perform frequency-domain transformation according to the first substitution formula:

$$Z(t)=H_1(t) \otimes S(t)+H_2(t) \otimes S^*(-t)$$

to obtain the first formula:

$$Z(f)=H_1(f)S(f)+H_2(f)S^*(-f),$$

perform frequency-domain transformation on s(t), s*(−t), and Z(t) separately to obtain S(f), S*(−f), and Z(f), and then, obtain the second formula:

$$\{Z(f)\}_i=H_1(f)\{S(f)\}_i+H_2(f)\{S'(f)\}_i$$

according to the first formula:

$$Z(f)=H_1(f)S(f)+H_2(f)S^*(-f)$$

obtained by transforming the first substitution formula.

It should be noted that, work content of the first estimation subunit 1031 is not limited to that described above, and all work content of acquiring the second formula:

$$\{Z(f)\}_i = H_1(f)\{S(f)\}_i + H_2(f)\{S'(f)\}_i$$

according to the first formula:

$$Z(f) = H_1(f)S(f) + H_2(f)S^*(-f)$$

or the first substitution formula:

$$Z(t) = H_1(t) \otimes S(t) + H_2(t) \otimes S^*(-t)$$

may be the work content of the first estimation subunit 1031 and can be covered in the embodiments.

The second estimation subunit 1032 is configured to successively substitute $S(f)$ and $S^*(-f)$, acquired by the transformation unit 102, of N frames from the $i^{th}$ frame and $Z(f)$, acquired by the acquiring unit 101, of the N frames from the $i^{th}$ frame into the second formula:

$$\{Z(f)\}_i = H_1(f)\{S(f)\}_i + H_2(f)\{S'(f)\}_i$$

acquired by the first estimation subunit 1031, to calculate an $N^{th}$-order system of linear equations, which is written in a matrix form:

$$\begin{bmatrix} \{Z(f)\}_i \\ \{Z(f)\}_{i+1} \\ \vdots \\ \{Z(f)\}_{i+N-1} \end{bmatrix} = \begin{bmatrix} \{S(f)\}_i & \{S'(f)\}_i \\ \{S(f)\}_{i+1} & \{S'(f)\}_{i+1} \\ \vdots & \vdots \\ \{S(f)\}_{i+N-1} & \{S'(f)\}_{i+N-1} \end{bmatrix} \begin{bmatrix} H_1(f) \\ H_2(f) \end{bmatrix},$$

and is expressed as $Z(f) = S(f)H(f)$, where $$Z(f) = \begin{bmatrix} \{Z(f)\}_i \\ \{Z(f)\}_{i+1} \\ \vdots \\ \{Z(f)\}_{i+N-1} \end{bmatrix},$$

$$S(f) = \begin{bmatrix} \{S(f)\}_i & \{S'(f)\}_i \\ \{S(f)\}_{i+1} & \{S'(f)\}_{i+1} \\ \vdots & \vdots \\ \{S(f)\}_{i+N-1} & \{S'(f)\}_{i+N-1} \end{bmatrix}, \text{ and}$$

$$H(f) = \begin{bmatrix} H_1(f) \\ H_2(f) \end{bmatrix}.$$

The third estimation subunit 1033 is configured to calculate, according to the matrices $Z(f)$, $S(f)$, and $H(\ )$ calculated by the second estimation subunit 1032, an expression for expressing a relationship among $Z(f)$, $S(f)$, and $\hat{H}(f)$, where $\hat{H}(f)$ is an estimated value matrix of $H(f)$, and $$\hat{H}(f) = \begin{bmatrix} \hat{H}_1(f) \\ \hat{H}_2(f) \end{bmatrix}.$$

The fourth estimation subunit 1034 is configured to calculate $\hat{H}_1(f)$ and $\hat{H}_2(f)$ with reference to the expression for expressing the relationship among $Z(f)$, $S(f)$, and $\hat{H}(f)$ that is calculated by the third estimation subunit 1033 and $$\hat{H}(f) = \begin{bmatrix} \hat{H}_1(f) \\ \hat{H}_2(f) \end{bmatrix}.$$

More further, optionally, the third estimation subunit 1033 is specifically configured to substitute the matrices $Z(f)$, $S(f)$, and $H(f)$ calculated by the second estimation subunit 1032 into a third formula:

$$\hat{H}(f) = \underset{H(f)}{\mathrm{argmin}} \|Z(f) - S(f)H(f)\|^2,$$

to calculate a fourth formula:

$$\hat{H}(f) = [S^H(f)S(f)]^{-1}S^H(f)Z(f),$$

where $S^H(f)$ is a conjugate transpose matrix of $S(f)$, and $$\hat{H}(f) = \begin{bmatrix} \hat{H}_1(f) \\ \hat{H}_2(f) \end{bmatrix}.$$

The fourth estimation subunit 1034 is specifically configured to calculate $\hat{H}_1(f)$ and $\hat{H}_2(f)$ with reference to the fourth formula:

$$\hat{H}(f) = [S^H(f)S(f)]^{-1}S^H(f)Z(f)$$

calculated by the third estimation subunit 1033 and $$\hat{H}(f) = \begin{bmatrix} \hat{H}_1(f) \\ \hat{H}_2(f) \end{bmatrix}.$$

Optionally, the third estimation subunit 1033 may be further specifically configured to substitute the matrices $Z(f)$, $S(f)$, and $H(f)$ calculated by the second estimation subunit 1032 into a third substitution formula:

$$\hat{H}(f) = \underset{H(f)}{\mathrm{argmin}} \sum_{i=0}^{n} \lambda^{n-i} \|\{Z(f)\}_i - \{S(f)\}_i \{H(f)\}_i\|^2,$$

to calculate a fourth substitution formula:

$$\hat{H}(f) = \left[\sum_{i=0}^{n} \lambda^{n-i} \{S^H(f)\}_i \{S(f)\}_i\right]^{-1} \left[\sum_{i=0}^{n} \lambda^{n-i} \{S^H(f)\}_i \{Z(f)\}_i\right],$$

where $0 < \lambda < 1$, and $\lambda$ is a forgetting factor in an RLS (recursive least-square) algorithm, $$\{Z(f)\}_i = \begin{bmatrix} \{Z(f)\}_i \\ \{Z(f)\}_{i+1} \\ M \\ \{Z(f)\}_{i+N-1} \end{bmatrix},$$

-continued $$\{S(f)\}_i = \begin{bmatrix} \{S(f)\}_i & \{S'(f)\}_i \\ \{S(f)\}_{i+1} & \{S'(f)\}_{i+1} \\ \vdots & \vdots \\ \{S(f)\}_{i+N-1} & \{S'(f)\}_{i+N-1} \end{bmatrix},$$

$S^H(f)$ is a conjugate transpose matrix of S(f), and $$\hat{H}(f) = \begin{bmatrix} \hat{H}_1(f) \\ \hat{H}_2(f) \end{bmatrix}.$$

Similarly, the fourth estimation subunit 1034 may be further specifically configured to calculate $\hat{H}_1(f)$ and $\hat{H}_2(f)$ with reference to the fourth substitution formula:

$$\hat{H}(f) = \left[\sum_{i=0}^{n} \lambda^{n-i} \{S^H(f)\}_i \{S(f)\}_i\right]^{-1} \left[\sum_{i=0}^{n} \lambda^{n-i} \{S^H(f)\}_i \{Z(f)\}_i\right]$$

calculated by the third estimation subunit 1033 and $$\hat{H}(f) = \begin{bmatrix} \hat{H}_1(f) \\ \hat{H}_2(f) \end{bmatrix}.$$

Herein, it should be noted that, because the second estimation subunit 1032 obtains the $N^{th}$-order system of linear equations Z(f)=S(f)H(f), and there may be many algorithms for solving H(f) by using such a system of equations to obtain the estimated value matrix $\hat{H}(f)$ of H(f), there may also be many expressions that are for expressing a relationship among Z(f), S(f), $\hat{H}(f)$, and that are obtained by using different solving methods. The third formula is an expression that is for expressing a relationship among Z(f), S(f), and $\hat{H}(f)$ and that is obtained according to an LS (least-square) algorithm, the third substitution formula is an expression that is for expressing a relationship among Z(f), S(f), and $\hat{H}(f)$ and that is obtained according to RLS (Recursive least-square) algorithm, and another expression that can express the relationship among Z(f), S(f), and $\hat{H}(f)$ can also be obtained by calculation by the third estimation subunit 1033, so that the fourth estimation subunit 1034 calculates $\hat{H}_1(f)$ and $\hat{H}_2(f)$ with reference to the expression for expressing the relationship among Z(f), S(f), and $\hat{H}(f)$ that is calculated by the third estimation subunit 1033 and $$\hat{H}(f) = \begin{bmatrix} \hat{H}_1(f) \\ \hat{H}_2(f) \end{bmatrix},$$

and all the work content can also be covered in the embodiments.

According to the signal processing apparatus provided in this embodiment of the embodiments, a self-interference signal affected by IQ imbalance can be calculated and used for self-interference cancellation, so as to implement self-interference cancellation when IQ imbalance exists in a communications system, which improves digital interference cancellation performance.

Figure 3:
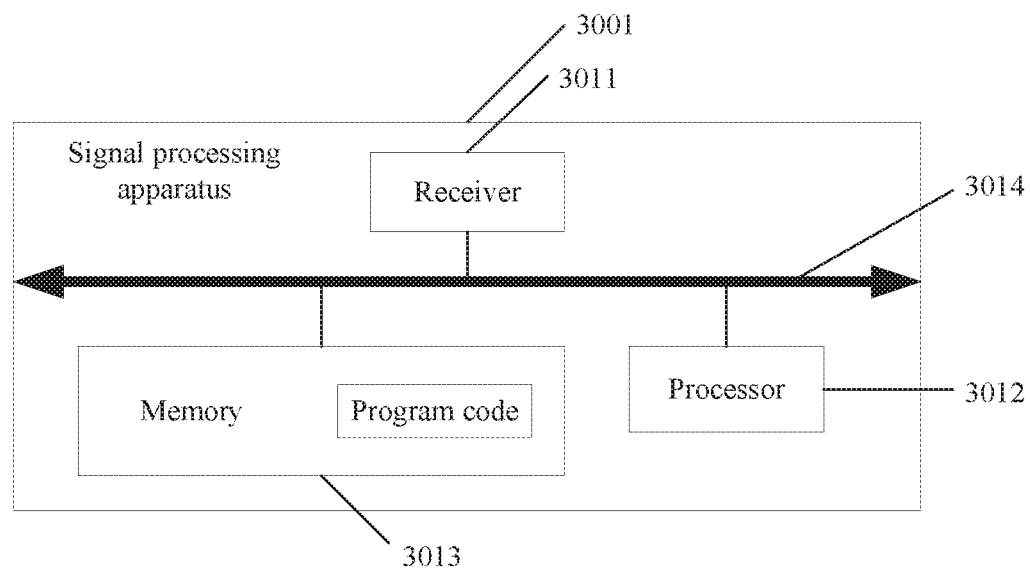
FIG. 3 is a schematic structural diagram of a signal processing apparatus according to another embodiment.

An embodiment provides a signal processing apparatus. As shown in FIG. 3, the signal processing apparatus may be built in or is a micro processing computer, for example, a general-purpose computer, a customized machine, or a portable device such as a mobile phone terminal or a tablet computer. The signal processing apparatus 3001 includes: at least one receiver 3011, a processor 3012, a memory 3013, and a bus 3014, where the at least one receiver 3011, the processor 3012, and the memory 313 are connected and implement mutual communication by using the bus 3014.

The bus 3014 may be an ISA (industry standard architecture) bus, a PCI (peripheral component interconnect) bus, an EISA (extended industry standard architecture) bus, or the like. The bus 3014 may be classified into an address bus, a data bus, a control bus, and the like. For ease of illustration, the bus 3014 is represented by using only one thick line in FIG. 3; however, it does not indicate that there is only one bus or only one type of bus.

The memory 3013 is configured to store executable program code, where the program code includes computer operation instructions. The memory 3013 may include a high-speed RAM memory, or may include a non-volatile memory, for example, at least one magnetic disk memory.

The processor 3012 may be a central processing unit (CPU) or an application-specific integrated circuit (ASIC), or may be configured as one or more integrated circuits that implement this embodiment.

The receiver 3011 is configured to acquire a digital baseband reference signal, a self-interference reference signal, and a frequency-domain baseband signal.

The self-interference reference signal includes a frequency-domain self-interference reference signal or a time-domain self-interference reference signal.

The processor 3012 is configured to obtain a basic reference signal and an image reference signal according to the digital baseband reference signal acquired by the receiver 3011.

The image reference signal is an image signal of the basic reference signal. The basic reference signal includes at least one of a basic frequency-domain reference signal or a basic time-domain reference signal, and the image reference signal includes at least one of an image frequency-domain reference signal or an image time-domain reference signal.

The processor 3012 is further configured to estimate an estimated value of a first comprehensive response and an estimated value of a second comprehensive response according to the basic reference signal obtained by the processor 3012, the image reference signal obtained by the processor 3012, and the self-interference reference signal acquired by the receiver 3011.

The first comprehensive response includes at least one of a first comprehensive frequency-domain response or a first comprehensive time-domain response, the second comprehensive response includes at least one of a second comprehensive frequency-domain response or a second comprehensive time-domain response, and the self-interference reference signal includes at least one of the frequency-domain self-interference reference signal or the time-domain self-interference reference signal.

Optionally, the processor 3012 may be configured to estimate an estimated value $\hat{H}_1(f)$ of $H_1(f)$ and an estimated value $\hat{H}_2(f)$ of $H_2(f)$ according to a first formula:

$$Z(f)=H_1(f)S(f)+H_2(f)S^*(-f),$$

where S(f) is the basic frequency-domain reference signal obtained by the processor 3012, $S^*(-f)$ is the image frequency-domain reference signal obtained by the processor

3012, Z(f) is the frequency-domain self-interference reference signal acquired by the receiver 3011, $H_1(f)$ is the first comprehensive frequency-domain response, $\hat{H}_1(f)$ is the estimated value of the first comprehensive frequency-domain response $H_1(f)$, $H_2(f)$ is the second comprehensive frequency-domain response, and $\hat{H}_2(f)$ is the estimated value of the second comprehensive frequency-domain response $H_2(f)$.

Specifically, when the processor 3012 obtains the basic frequency-domain reference signal S(f), the processor 3012 obtains the image frequency-domain reference signal S*(−f), and the receiver 3011 acquires the frequency-domain self-interference reference signal Z(f), the processor 3012 can estimate the estimated value $\hat{H}_1(f)$ of $H_1(f)$ and the estimated value $\hat{H}_2(f)$ of $H_2(f)$ according to the first formula:

$$Z(f)=H_1(f)S(f)+H_2(f)S^*(-f).$$

Optionally, the processor 3012 may be configured to estimate an estimated value $\hat{H}_1(f)$ of $H_1(f)$ and an estimated value $\hat{H}_2(f)$ of $H_2(f)$ according to a first substitution formula:

$$Z(t)=H_1(t) \otimes S(t)+H_2(t) \otimes S^*(-t),$$

where s(t) is the basic time-domain reference signal obtained by the processor 3012, s*(−t) is the image time-domain reference signal obtained by the processor 3012, Z(t) is the time-domain self-interference reference signal acquired by the receiver 3011, $H_1(t)$ is the first comprehensive time-domain response, and $H_2(t)$ is the second comprehensive time-domain response, where $H_1(f)$ may be a Fourier transform value of $H_1(t)$, $H_2(f)$ may be a Fourier transform value of $H_2(t)$, and $\otimes$ represents convolution; and $H_1(f)$ is a first comprehensive frequency-domain response, $\hat{H}_1(f)$ is an estimated value of the first comprehensive frequency-domain response $H_1(f)$, $H_2(f)$ is a second comprehensive frequency-domain response, and $\hat{H}_2(f)$ is an estimated value of the second comprehensive frequency-domain response $H_2(f)$.

Specifically, when the processor 3012 obtains the basic time-domain reference signal s(t), the processor 3012 obtains the image time-domain reference signal s*(−t), and the receiver 3011 acquires the time-domain self-interference reference signal Z(t), the processor 3012 can estimate the estimated value $\hat{H}_1(t)$ of $H_1(t)$ and the estimated value $\hat{H}_2(t)$ of $H_2(t)$ according to the first substitution formula:

$$Z(t)=H_1(t) \otimes S(t)+H_2(t) \otimes S^*(-t).$$

$H_1(t)$ may be a time-domain expression form corresponding to $H_1(f)$, and $H_2(t)$ may be a time-domain expression form corresponding to $H_2(f)$. Correspondingly, $\hat{H}_1(t)$ may be a time-domain expression form corresponding to $\hat{H}_1(f)$, and $\hat{H}_2(t)$ may be a time-domain expression form corresponding to $\hat{H}_2(f)$. Therefore, Fourier transform may be performed on $\hat{H}_1(t)$ or a manner of Fourier series may be used, to obtain $\hat{H}_1(f)$, and Fourier transform may also be performed on $\hat{H}_2(t)$ or a manner of Fourier series may also be used, to obtain $\hat{H}_2(f)$.

When the foregoing signals are periodic signals, $\hat{H}_1(t)$ and $\hat{H}_2(t)$ are respectively transformed into $\hat{H}_1(f)$ and $\hat{H}_2(f)$ in the form of Fourier series; when the foregoing signals are non-periodic signals, $\hat{H}_1(t)$ and $\hat{H}_2(t)$ are respectively transformed into $\hat{H}_1(f)$ and $\hat{H}_2(f)$ by means of Fourier transform. In this case, the processor 3012 may further transform the first substitution formula into the first formula, perform frequency-domain transformation on s(t), and s*(−t), and Z(t) separately to obtain S(f), S*(−f), and Z(f), and obtain $\hat{H}_1(f)$ and $\hat{H}_2(f)$ with reference to the first formula, where Z(f) may be a Fourier transform value of Z(t), and Z(f) is the frequency-domain self-interference reference signal.

Herein, it should be noted that, work content of the processor 3012 is not limited to the foregoing two aspects, all other work content of estimating the estimated value $\hat{H}_1(f)$ of $H_1(f)$ and the estimated value $\hat{H}_2(f)$ of $H_2(f)$ according to the first formula:

$$Z(f)=H_1(f)S(f)+H_2(f)S^*(-f)$$

or the first substitution formula:

$$Z(t)=H_1(t) \otimes S(t)+H_2(t) \otimes S^*(-t)$$

can be implemented by the processor 3012, and all the work content can be covered in the embodiments.

The processor 3012 is further configured to calculate a self-interference signal according to the estimated value of the first comprehensive response that is estimated by the processor 3012, the estimated value of the second comprehensive response that is estimated by the processor 3012, the basic reference signal obtained by the processor 3012, and the image reference signal obtained by the processor 3012, so that the signal processing apparatus 3001 performs self-interference cancellation on the frequency-domain baseband signal acquired by the receiver 3011.

Specifically, the processor 3012 may be further configured to calculate $\hat{Z}(f)$ according to a fifth formula:

$$\hat{Z}(f)=\hat{H}_1(f)S(f)+\hat{H}_2(f)S^*(-f),$$

so that the signal processing apparatus performs self-interference cancellation on the frequency-domain baseband signal, where $\hat{Z}(f)$ is a frequency-domain self-interference signal, $\hat{H}_1(f)$ is the estimated value of the first comprehensive frequency-domain response that is estimated by the processor 3012, $\hat{H}_2(f)$ is the estimated value of the second comprehensive frequency-domain response that is estimated by processor 3012, S(f) is the basic frequency-domain reference signal obtained by the processor 3012, and S*(−f) is the image frequency-domain reference signal obtained by the processor 3012.

Optionally, the processor 3012 being specifically configured to estimate an estimated value $\hat{H}_1(f)$ of $H_1(f)$ and an estimated value $\hat{H}_2(f)$ of $H_2(f)$ according to a first formula:

$$Z(f)=H_1(f)S(f)+H_2(f)S^*(-f)$$

may include the following content: the processor 3012 being specifically configured to acquire a second formula:

$$\{Z(f)\}_i=H_1(f)\{S(f)\}_i+H_2(f)\{S'(f)\}_i$$

according to the first formula:

$$Z(f)=H_1(f)S(f)+H_2(f)S^*(-f),$$

where the second formula is a relational expression about S(f) and S*(−f) of the $i^{th}$ frame that are acquired by the processor 3012 and Z(f) of the $i^{th}$ frame that is acquired by the receiver 3011, and S'(f)=S*(−f).

Specifically, when the processor 3012 obtains the basic frequency-domain reference signal S(f), the processor 3012 obtains the image frequency-domain reference signal S*(−f), and the receiver 3011 acquires the frequency-domain self-interference reference signal Z(f), the processor 3012 can obtain the second formula:

$$\{Z(f)\}_i=H_1(f)\{S(f)\}_i+H_2(f)\{S'(f)\}_i$$

according to the first formula:

$$Z(f)=H_1(f)S(f)+H_2(f)S^*(-f).$$

More further, optionally, the processor 3012 may be further specifically configured to acquire a second formula:

$$\{Z(f)\}_i=H_1(f)\{S(f)\}_i+H_2(f)\{S'(f)\}_i$$

according to the first formula:

$$Z(f)=H_1(f)S(f)+H_2(f)S^*(-f)$$

or the first substitution formula:

$$Z(t)=H_1(t) \otimes S(t)+H_2(t) \otimes S^*(-t),$$

where Z(f) may be a Fourier transform value of Z(t), and Z(f) is the frequency-domain self-interference reference signal.

Specifically, when the processor 3012 obtains the basic time-domain reference signal s(t), the processor 3012 obtains the image time-domain reference signal s*(−t), and the receiver 3011 acquires the time-domain self-interference reference signal Z(t), the processor 3012 may also perform frequency-domain transformation according to the first substitution formula:

$$Z(t)=H_1(t) \otimes S(t)+H_2(t) \otimes S^*(-t)$$

to obtain the first formula:

$$Z(f)=H_1(f)S(f)+H_2(f)S^*(-f),$$

perform frequency-domain transformation on s(t), s*(t−t), and Z(t) separately to obtain S(f), S*(−f) and Z(t), and then, obtain the second formula:

$$\{Z(f)\}_i=H_1(f)\{S(f)\}_i+H_2(f)\{S'(f)\}_i$$

according to the first formula:

$$Z(f)=H_1(f)S(f)+H_2(f)S^*(-f)$$

obtained by transforming the first substitution formula.

It should be noted that, work content of the processor 3012 is not limited to that described above, and all work content of acquiring the second formula:

$$\{Z(f)\}_i=H_1(f)\{S(f)\}_i+H_2(f)\{S'(f)\}_i$$

according to the first formula:

$$Z(f)=H_1(f)S(f)+H_2(f)S^*(-f)$$

or the first substitution formula:

$$Z(t)=H_1(t) \otimes S(t)+H_2(t) \otimes S^*(-t)$$

may be the work content of the processor 3012 and can be covered in the embodiments.

The processor 3012 is further configured to substitute S(f) and S*(−f), acquired by the processor 3012, of N frames from the $i^{th}$ frame and Z(f), acquired by the receiver 3011, of the N frames from the $i^{th}$ frame into the second formula:

$$\{Z(f)\}_i=H_1(f)\{S(f)\}_i+H_2(f)\{S'(f)\}_i$$

acquired by the processor 3012, to calculate an $N^{th}$-order system of linear equations, which is written in a matrix form:

$$\begin{bmatrix} \{Z(f)\}_i \\ \{Z(f)\}_{i+1} \\ \vdots \\ \{Z(f)\}_{i+N-1} \end{bmatrix} = \begin{bmatrix} \{S(f)\}_i & \{S'(f)\}_i \\ \{S(f)\}_{i+1} & \{S'(f)\}_{i+1} \\ \vdots & \vdots \\ \{S(f)\}_{i+N-1} & \{S'(f)\}_{i+N-1} \end{bmatrix} \begin{bmatrix} H_1(f) \\ H_2(f) \end{bmatrix},$$

and is expressed as:

$$Z(f)=S(f)H(f), \text{ where}$$

$$Z(f) = \begin{bmatrix} \{Z(f)\}_i \\ \{Z(f)\}_{i+1} \\ \vdots \\ \{Z(f)\}_{i+N-1} \end{bmatrix},$$

$$S(f) = \begin{bmatrix} \{S(f)\}_i & \{S'(f)\}_i \\ \{S(f)\}_{i+1} & \{S'(f)\}_{i+1} \\ \vdots & \vdots \\ \{S(f)\}_{i+N-1} & \{S'(f)\}_{i+N-1} \end{bmatrix}, \text{ and}$$

$$H(f) = \begin{bmatrix} H_1(f) \\ H_2(f) \end{bmatrix}.$$

The processor 3012 is further configured to calculate, according to the matrices Z(f), S(f), and H(f) calculated by the processor 3012, an expression for expressing a relationship among Z(f), S(f), and H(f), where Ĥ(f) is an estimated value matrix of H(f), and $$\hat{H}(f) = \begin{bmatrix} \hat{H}_1(f) \\ \hat{H}_2(f) \end{bmatrix}.$$

The processor 3012 is further configured to calculate $\hat{H}_1(f)$ and $\hat{H}_2(f)$ with reference to the expression for expressing the relationship among Z(f), S(f), and Ĥ(f) that is calculated by the processor 3012 and:

$$\hat{H}(f) = \begin{bmatrix} \hat{H}_1(f) \\ \hat{H}_2(f) \end{bmatrix}.$$

More further, optionally, the processor 3012 is further specifically configured to substitute the foregoing matrices Z(f), S(f), and H(f) into a third formula:

$$\hat{H}(f) = \underset{H(f)}{\mathrm{argmin}} \|Z(f) - S(f)H(f)\|^2,$$

to calculate a fourth formula:

$$\hat{H}(f) = [S^H(f)S(f)]^{-1}S^H(f)Z(f),$$

where $S^H(f)$ is a conjugate transpose matrix of S(f), and $$\hat{H}(f) = \begin{bmatrix} \hat{H}_1(f) \\ \hat{H}_2(f) \end{bmatrix}.$$

The processor 3012 is further specifically configured to calculate $\hat{H}_1(f)$ and $\hat{H}_2(f)$ with reference to the fourth formula:

$$\hat{H}(f) = [S^H(f)S(f)]^{-1}S^H(f)Z(f)$$

calculated by the processor 3012 and $$\hat{H}(f) = \begin{bmatrix} \hat{H}_1(f) \\ \hat{H}_2(f) \end{bmatrix}.$$

Optionally, the processor 3012 may be further specifically configured to substitute the matrices Z(f), S(f), and H(f) calculated by the processor 3012 into a third substitution formula:

$$\hat{H}(f) = \underset{H(f)}{\mathrm{argmin}} \sum_{i=0}^{n} \lambda^{n-i} \|\{Z(f)\}_i - \{S(f)\}_i \{H(f)\}_i\|^2,$$

to calculate a fourth substitution formula:

$$\hat{H}(f) = \left[\sum_{i=0}^{n} \lambda^{n-i} \{S^H(f)\}_i \{S(f)\}_i\right]^{-1} \left[\sum_{i=0}^{n} \lambda^{n-i} \{S^H(f)\}_i \{Z(f)\}_i\right],$$

where 0<λ<1, which is a forgetting factor in an RLS (Recursive least-square) algorithm, $$\{Z(f)\}_i = \begin{bmatrix} \{Z(f)\}_i \\ \{Z(f)\}_{i+1} \\ M \\ \{Z(f)\}_{i+N-1} \end{bmatrix},$$

$$\{S(f)\}_i = \begin{bmatrix} \{S(f)\}_i & \{S'(f)\}_i \\ \{S(f)\}_{i+1} & \{S'(f)\}_{i+1} \\ \vdots & \vdots \\ \{S(f)\}_{i+N-1} & \{S'(f)\}_{i+N-1} \end{bmatrix},$$

$S^H(f)$ is a conjugate transpose matrix of S)f), and $$\hat{H}(f) = \begin{bmatrix} \hat{H}_1(f) \\ \hat{H}_2(f) \end{bmatrix}.$$

Similarly, the processor 3012 may be further specifically configured to calculate $\hat{H}_1(f)$ and $\hat{H}_2(f)$ with reference to the fourth substitution formula:

$$\hat{H}(f) = \left[\sum_{i=0}^{n} \lambda^{n-i} \{S^H(f)\}_i \{S(f)\}_i\right]^{-1} \left[\sum_{i=0}^{n} \lambda^{n-i} \{S^H(f)\}_i \{Z(f)\}_i\right]$$

calculated by the processor 3012 and $$\hat{H}(f) = \begin{bmatrix} \hat{H}_1(f) \\ \hat{H}_2(f) \end{bmatrix}.$$

Herein, it should be noted that, because the processor 3012 obtains the $N^{th}$-order system of linear equations Z(f)=S(f)H(f), and there may be many algorithms for solving H(f) by using such a system of equations to obtain the estimated value matrix $\hat{H}(f)$ of H(f), there may also be many expressions that are for expressing a relationship among Z(f), S(f), and $\hat{H}(f)$ and that are obtained by using different solving methods. The third formula is an expression that is for expressing a relationship among Z(f), S(f), and $\hat{H}(f)$ and that is obtained according to an LS (least square) algorithm, the third substitution formula is an expression that is for expressing a relationship among Z(f), S(f), and $\hat{H}(f)$ and that is obtained according to RLS (Recursive least-square) algorithm, and another expression that can express the relationship among Z(f), S(f), and $\hat{H}(f)$ can also be obtained by calculation by the processor 3012, so that the processor 3012 calculates $\hat{H}_1(f)$ and $\hat{H}_2(f)$ with reference to the expression for expressing the relationship among Z(f), S(f), and $\hat{H}(f)$ that is calculated by the processor 3012 and $$\hat{H}(f) = \begin{bmatrix} \hat{H}_1(f) \\ \hat{H}_2(f) \end{bmatrix},$$

and all the work content can also be covered in the embodiments.

According to the signal processing apparatus provided in this embodiment, a self-interference signal affected by IQ imbalance can be calculated and used for self-interference cancellation, so as to implement self-interference cancellation when IQ imbalance exists in a communications system, which improves digital interference cancellation performance.

With descriptions of the foregoing embodiments, a person skilled in the art may clearly understand that the embodiments may be implemented by hardware, firmware, or a combination thereof. When the embodiment is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another place. The storage medium may be any available medium accessible to a computer. Examples of the computer-readable medium may include but are not limited to: a RAM (random access memory), a ROM (read only memory), an EEPROM (electrically erasable programmable read only memory), a CD-ROM (Compact Disc Read Only Memory), or another compact disc storage, a disk storage medium or another magnetic storage device, or any other computer-accessible medium that can be used to carry or store expected program code in a form of an instruction or a data structure. In addition, any connection may be appropriately defined as a computer-readable medium. For example, if software is transmitted from a website, a server, or another remote source by using a coaxial cable, an optical fiber/cable, a twisted pair, a DSL (digital subscriber line), or wireless technologies such as infrared ray, radio and microwave, the coaxial cable, optical fiber/cable, twisted pair, DSL, or wireless technologies such as infrared ray, radio and microwave are included in a definition of a medium. For example, a disk and a disc used in the embodiment include a CD (compact disc), a laser disc, an optical disc, a DVD (digital versatile disc), a floppy disk, and a Blue-ray disc, where the disk generally copies data magnetically, and the disc copies data optically using laser. The foregoing combination should also be included in the protection scope of the computer-readable medium.

Figure 4:
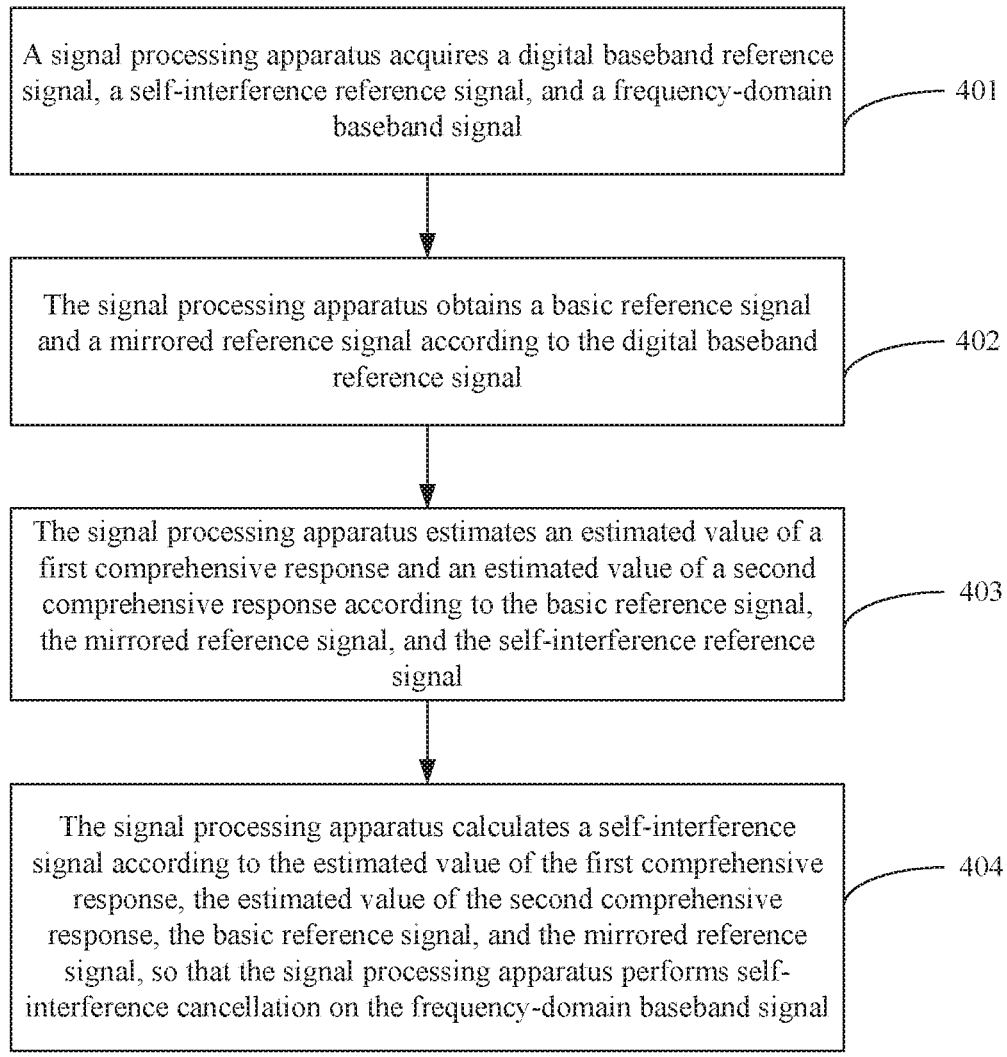
FIG. 4 is a schematic flowchart of a signal processing method according to an embodiment.
Figure 5:
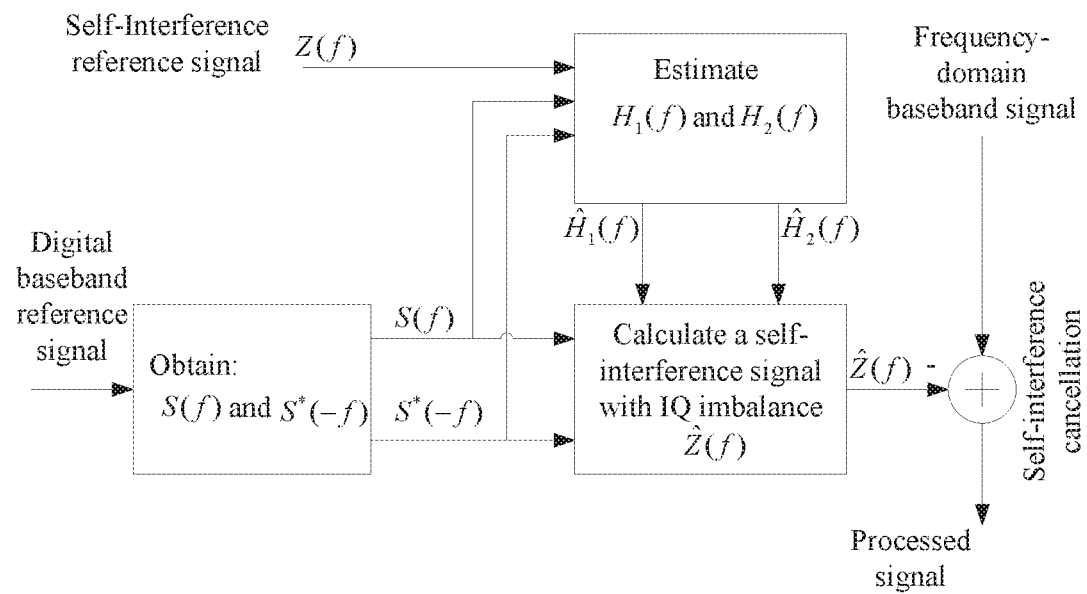
FIG. 5 is a schematic operational diagram of a signal processing method according to an embodiment.

An embodiment provides a signal processing method. As shown in FIG. 4, the signal processing method is used to implement self-interference cancellation in the field of communications and can be applied to the signal processing apparatuses provided in the foregoing embodiments. For ease of understanding, reference may be made to FIG. 5. The method includes the following steps.

401: A signal processing apparatus acquires a digital baseband reference signal, a self-interference reference signal, and a frequency-domain baseband signal.

The self-interference reference signal includes a frequency-domain self-interference reference signal or a time-domain self-interference reference signal.

402: The signal processing apparatus obtains a basic reference signal and an image reference signal according to the digital baseband reference signal.

The image reference signal is an image signal of the basic reference signal. The basic reference signal includes at least one of a basic frequency-domain reference signal or a basic time-domain reference signal, and the image reference signal includes at least one of an image frequency-domain reference signal or an image time-domain reference signal.

Specifically, because the image reference signal is the image signal of the basic reference signal, and a method for obtaining the basic reference signal according to the digital baseband reference signal is an existing technology, a specific method for obtaining the basic reference signal and the image reference signal is not repeatedly described herein.

403: The signal processing apparatus estimates an estimated value of a first comprehensive response and an estimated value of a second comprehensive response according to the basic reference signal, the image reference signal, and the self-interference reference signal.

The first comprehensive response includes at least one of a first comprehensive frequency-domain response or a first comprehensive time-domain response, the second comprehensive response includes at least one of a second comprehensive frequency-domain response or a second comprehensive time-domain response, and the self-interference reference signal includes at least one of the frequency-domain self-interference reference signal or the time-domain self-interference reference signal.

Optionally, the signal processing apparatus may estimate an estimated value $\hat{H}_1(f)$ of $H_1(f)$ and an estimated value $\hat{H}_2(f)$ of $H_2(f)$ according to a first formula:

$$Z(f)=H_1(f)S(f)+H_2(f)S^*(-f),$$

where $S(f)$ is the basic frequency-domain reference signal, $S^*(-f)$ is the image frequency-domain reference signal, $Z(f)$ is the frequency-domain self-interference reference signal, $H_1(f)$ is the first comprehensive frequency-domain response, $\hat{H}_1(f)$ is the estimated value of the first comprehensive frequency-domain response $H_1(f)$, $H_2(f)$ is the second comprehensive frequency-domain response, and $\hat{H}_2(f)$ is the estimated value of the second comprehensive frequency-domain response $H_2(f)$.

Specifically, when obtaining the basic frequency-domain reference signal $S(f)$, the image frequency-domain reference signal $S^*(-f)$, and the frequency-domain self-interference reference signal $Z(f)$, the signal processing apparatus can estimate the estimated value $\hat{H}_1(f)$ of $H_1(f)$ and the estimated value $\hat{H}_2(f)$ of $H_2(f)$ according to the first formula:

$$Z(f)=H_1(f)S(f)+H_2(f)S^*(-f).$$

Optionally, the signal processing apparatus may estimate an estimated value $\hat{H}_1(f)$ of $H_1(f)$ and an estimated value $\hat{H}_2(f)$ of $H_2(f)$ according to a first substitution formula:

$$Z(t)=H_1(t)\otimes S(t)+H_2(t)\otimes S^*(-t),$$

where $s(t)$ is the basic time-domain reference signal, $s^*(-t)$ is the image time-domain reference signal, $Z(t)$ is the time-domain self-interference reference signal, $H_1(t)$ is the first comprehensive time-domain response, and $H_2(t)$ is the second comprehensive time-domain response, where $H_1(f)$ may be a Fourier transform value of $H_1(t)$, $H_2(f)$ may be a Fourier transform value of $H_2(t)$, and $\otimes$ represents convolution.

Specifically, when the signal processing apparatus obtains the basic time-domain reference signal $s(t)$, the image time-domain reference signal $s^*(-t)$, and the time-domain self-interference reference signal $Z(t)$, the signal processing apparatus can estimate the estimated value $\hat{H}_1(t)$ of $H_1(t)$ and the estimated value $\hat{H}_2(t)$ of $H_2(t)$ according to the first substitution formula:

$$Z(t)=H_1(t)\otimes S(t)+H_2(t)\otimes S^*(-t).$$

$H_1(t)$ may be a time-domain expression form corresponding to $H_1(f)$, and $H_2(t)$ may be a time-domain expression form corresponding to $H_2(f)$. Correspondingly, $\hat{H}_1(t)$ may be a time-domain expression form corresponding to $\hat{H}_1(f)$, and $\hat{H}_2(t)$ may be a time-domain expression form corresponding to $\hat{H}_2(f)$. Therefore, Fourier transform may be performed on $\hat{H}_1(t)$ or a manner of Fourier series may be used, to obtain $\hat{H}_1(f)$, and Fourier transform may also be performed on $\hat{H}_2(t)$ or a manner of Fourier series may also be used, to obtain $\hat{H}_2(f)$.

When the foregoing signals are periodic signals, $\hat{H}_1(t)$ and $\hat{H}_2(t)$ are respectively transformed into $\hat{H}_1(f)$ and $\hat{H}_2(f)$ in the form of Fourier series; when the foregoing signals are non-periodic signals, $\hat{H}_1(t)$ and $\hat{H}_2(t)$ are respectively transformed into $\hat{H}_1(f)$ and $\hat{H}_2(f)$ by means of Fourier transform. In this case, the signal processing apparatus may further transform the first substitution formula into the first formula, perform frequency-domain transformation on $s(t)$, $s^*(-t)$, and $Z(t)$ separately to obtain $S(f)$, $S^*(-f)$, and $Z(f)$, and obtain $\hat{H}_1(f)$ and $\hat{H}_2(f)$ with reference to the first formula, where $Z(f)$ may be a Fourier transform value of $Z(t)$, and $Z(f)$ is the frequency-domain self-interference reference signal.

Herein, it should be noted that, the signal processing method is not limited to that described above, and all other methods for estimating the estimated value $\hat{H}_1(f)$ of $H_1(f)$ and the estimated value $\hat{H}_2(f)$ of $H_2(f)$ according to the first formula:

$$Z(f)=H_1(f)S(f)+H_2(f)S^*(-f)$$

or the first substitution formula:

$$Z(t)=H_1(t)\otimes S(t)+H_2(t)\otimes S^*(-t)$$

can be covered in the embodiments.

Further, step 403 may be implemented by using the following specific steps:

4031: The signal processing apparatus acquires a second formula:

$$\{Z(f)\}_i=H_1(f)\{S(f)\}_i+H_2(f)\{S'(f)\}_i$$

according to the first formula:

$$Z(f)=H_1(f)S(f)+H_2(f)S^*(-f).$$

The second formula is a relational expression about $S(f)$, $S^*(-f)$, and $Z(f)$ of the $i^{th}$ frame that are acquired by the signal processing apparatus, and $S'(f)=S^*(-f)$.

Specifically, when obtaining the basic frequency-domain reference signal $S(f)$, the image frequency-domain reference signal $S^*(-f)$, and the frequency-domain self-interference reference signal $Z(f)$, the signal processing apparatus can obtain the second formula:

$$\{Z(f)\}_i=H_1(f)\{S(f)\}_i+H_2(f)\{S'(f)\}_i$$

according to the first formula:

$$Z(f)=H_1(f)S(f)+H_2(f)S^*(-f).$$

Optionally, according to the optional solution of step 403, step 4031 may also be substituted by the following step 4031a:

4031a: The signal processing apparatus acquires a second formula:

$$\{Z(f)\}_i=H_1(f)\{S(f)\}_i+H_2(f)\{S'(f)\}_i$$

according to the first substitution formula:

$$Z(t)=h_1(t)\otimes S(t)+H_2(t)\otimes S^*(-t),$$

where $Z(f)$ may be a Fourier transform value of $Z(t)$, and $Z(f)$ is the frequency-domain self-interference reference signal.

Specifically, when obtaining the basic time-domain reference signal $s(t)$, the image time-domain reference signal $s^*(-t)$, and the time-domain self-interference reference signal $Z(t)$, the signal processing apparatus may also perform frequency-domain transformation according to the first substitution formula:

$$Z(t)=H_1(t)\otimes S(t)+H_2(t)\otimes S^*(-t)$$

to obtain the first formula:

$$Z(f)=H_1(f)S(f)+H_2(f)S^*(-f),$$

perform frequency-domain transformation on $s(t)$, $s^*(-t)$, and $Z(t)$ separately to obtain $S(f)$, $S^*(-f)$, and $Z(f)$, and then, obtain the second formula:

$$\{Z(f)\}_i=H_1(f)\{S(f)\}_i+H_2(f)\{S(f)\}_i$$

according to the first formula:

$$Z(f)=H_1(f)S(f)+H_2(f)S^*(-f)$$

transformed from the first substitution formula.

It should be noted that, the signal processing method is not limited to that described above, and all methods for acquiring the second formula:

$$\{Z(f)\}_i=H_1(f)\{S(f)\}_i+H_2(f)\{S(f)\}_i$$

according to the first formula:

$$Z(f)=H_1(f)S(f)+H_2(f)S^*(-f)$$

or the first substitution formula:

$$Z(t)=H_1(t)\otimes S(t)+H_2\otimes S^*(-t)$$

can be covered in the embodiments.

4032: Successively substitute basic reference signals, image reference signals, and self-interference reference signals, acquired by the signal processing apparatus, of N frames from the $i^{th}$ frame into the second formula, to calculate an $N^{th}$-order system of linear equations.

In step 4032, specifically, $S(f)$, $S'(-f)$, and $Z(f)$, acquired by the signal processing apparatus, of N frames from the $i^{th}$ frame are successively substituted into the second formula $\{Z(f)\}_i=H_1(f)\{S(f)\}_i+H_2(f)\{S'(f)\}_i$, to calculate the $N^{th}$-order system of linear equations, which is written in a matrix form:

$$\begin{bmatrix}\{Z(f)\}_i\\\{Z(f)\}_{i+1}\\\vdots\\\{Z(f)\}_{i+N-1}\end{bmatrix}=\begin{bmatrix}\{S(f)\}_i & \{S'(f)\}_i\\\{S(f)\}_{i+1} & \{S'(f)\}_{i+1}\\\vdots & \vdots\\\{S(f)\}_{i+N-1} & \{S'(f)\}_{i+N-1}\end{bmatrix}\begin{bmatrix}H_1(f)\\H_2(f)\end{bmatrix}$$

and is expressed as:

$$Z(f)=S(f)H(f),$$

where $$Z(f)=\begin{bmatrix}\{Z(f)\}_i\\\{Z(f)\}_{i+1}\\\vdots\\\{Z(f)\}_{i+N-1}\end{bmatrix},\ S(f)=\begin{bmatrix}\{S(f)\}_i & \{S'(f)\}_i\\\{S(f)\}_{i+1} & \{S'(f)\}_{i+1}\\\vdots & \vdots\\\{S(f)\}_{i+N-1} & \{S'(f)\}_{i+N-1}\end{bmatrix},\text{ and}$$

$$H(f)=\begin{bmatrix}H_1(f)\\H_2(f)\end{bmatrix}.$$

The foregoing $N^{th}$-order system of linear equations is a relationship among the matrices $Z(f)$, $S(f)$, and $H(f)$.

4033: The signal processing apparatus calculates, according to the $N^{th}$-order system of linear equations, a first expression for expressing a relationship among a matrix of the self-interference reference signal, a matrix of the basic reference signal and the image reference signal, and an estimated value matrix of the comprehensive responses.

In step 4033, specifically, the signal processing apparatus calculates, according to the matrices $Z(f)$, $S(f)$, and $H(f)$ in the $N^{th}$-order system of linear equations, the first expression for expressing a relationship among $Z(f)$, $S(f)$, and $\hat{H}(f)$, where $\hat{H}(f)$ is an estimated value matrix of $H(f)$, and $$\hat{H}(f)=\begin{bmatrix}\hat{H}_1(f)\\\hat{H}_2(f)\end{bmatrix}.$$

4034: The signal processing apparatus calculates the estimated value of the first comprehensive response and the estimated value of the second comprehensive response with reference to the first expression and the estimated value matrix of the comprehensive responses.

In step 4034, specifically, the signal processing apparatus calculates $\hat{H}_1(f)$ and $\hat{H}_2(f)$ with reference to the first expression and the estimated value matrix of the comprehensive responses $$\hat{H}(f)=\begin{bmatrix}\hat{H}_1(f)\\\hat{H}_2(f)\end{bmatrix}.$$

Optionally, the foregoing step 4033 and step 4034 may be specifically implemented by the following step 4033a and step 4034a, and a relationship between step 4033a and step 4034a is equivalent to a relationship between step 4033 and step 4034.

4033a: The signal processing apparatus substitutes the matrices $Z(f)$, $S(f)$, and $H(f)$ into a third formula:

$$\hat{H}(f)=\underset{H(f)}{\arg\min}\|Z(f)-S(f)H(f)\|^2,$$

to calculate a fourth formula:

$$\hat{H}(f)=[S^H(f)S(f)]^{-1}S^H(f)Z(f),$$

where $S^H(f)$ is a conjugate transpose matrix of $S(f)$, and $$\hat{H}(f) = \begin{bmatrix} \hat{H}_1(f) \\ \hat{H}_2(f) \end{bmatrix}.$$

4034a: The signal processing apparatus calculates $\hat{H}_1(f)$ and $\hat{H}_2(f)$ with reference to the fourth formula:

$$\hat{H}(f) = [S^H(f)S(f)]^{-1}S^H(f)Z(f) \text{ and}$$

$$\hat{H}(f) = \begin{bmatrix} \hat{H}_1(f) \\ \hat{H}_2(f) \end{bmatrix}.$$

Optionally, the foregoing step 4033 and step 4034 may also be specifically implemented by the following step 4033b and step 4034b, and a relationship between step 4033b and step 4034b is equivalent to a relationship between step 4033 and step 4034.

4033b: The signal processing apparatus substitutes the matrices $Z(f)$, $S(f)$, and $H(f)$ into a third substitution formula:

$$\hat{H}(f) = \underset{H(f)}{\arg\min} \sum_{i=0}^{n} \lambda^{n-i} \|\{Z(f)\}_i - \{S(f)\}_i \{H(f)\}_i\|^2,$$

to calculate a fourth substitution formula:

$$\hat{H}(f) = \left[ \sum_{i=0}^{n} \lambda^{n-i} \{S^H(f)\}_i \{S(f)\}_i \right]^{-1} \left[ \sum_{i=0}^{n} \lambda^{n-i} \{S^H(f)\}_i \{Z(f)\}_i \right],$$

where $0<\lambda<1$, which is a forgetting factor in an RLS (Recursive least-square) algorithm, $$\{Z(f)\}_i = \begin{bmatrix} \{Z(f)\}_i \\ \{Z(f)\}_{i+1} \\ M \\ \{Z(f)\}_{i+N-1} \end{bmatrix},$$

$$\{S(f)\}_i = \begin{bmatrix} \{S(f)\}_i & \{S'(f)\}_i \\ \{S(f)\}_{i+1} & \{S'(f)\}_{i+1} \\ \vdots & \vdots \\ \{S(f)\}_{i+N-1} & \{S'(f)\}_{i+N-1} \end{bmatrix},$$

$S^H(f)$ is a conjugate transpose matrix of $S(f)$, and $$\hat{H}(f) = \begin{bmatrix} \hat{H}_1(f) \\ \hat{H}_2(f) \end{bmatrix}.$$

4034b: The signal processing apparatus calculates $\hat{H}_1(f)$ and $12\hat{H}_2(f)$ with reference to the fourth substitution formula:

$$\hat{H}(f) = \left[ \sum_{i=0}^{n} \lambda^{n-i} \{S^H(f)\}_i \{S(f)\}_i \right]^{-1} \left[ \sum_{i=0}^{n} \lambda^{n-i} \{S^H(f)\}_i \{Z(f)\}_i \right] \text{ and}$$

$$\hat{H}(f) = \begin{bmatrix} \hat{H}_1(f) \\ \hat{H}_2(f) \end{bmatrix}.$$

Herein, it should be noted that, because the $N^{th}$-order system of linear equations $Z(f)=S(f)H(f)$ is obtained in step 4032, and there may be many algorithms for solving $H(f)$ by using such a system of equations to obtain the estimated value matrix $\hat{H}(f)$ of $H_1(f)$, there may also be many expressions that are for expressing a relationship among $Z(f)$, $S(f)$, and $\hat{H}(f)$ and that are obtained by using different solving methods. The third formula is an expression that is for expressing a relationship among $Z(f)$, $S(f)$, and $\hat{H}(f)$, and that is obtained according to an LS (least square) algorithm, the third substitution formula is an expression that is for expressing a relationship among $Z(f)$, $S(f)$, and $\hat{H}(f)$, and that is obtained according to RLS (Recursive least-square) algorithm, and another expression that can express the relationship among $Z(f)$, $S(f)$, and $\hat{H}(f)$ can also be obtained by calculation in step 4033, so that $\hat{H}_1(f)$ and $\hat{H}_2(f)$ are calculated in step 4034 with reference to the expression for expressing the relationship among $Z(f)$, $S(f)$, $\hat{H}(f)$, and $$\hat{H}(f) = \begin{bmatrix} \hat{H}_1(f) \\ \hat{H}_2(f) \end{bmatrix},$$

and all the work content can also be covered in the embodiments.

In the foregoing step, $\hat{H}_1(f)$ is the estimated value of the first comprehensive response $H_1(f)$, and $\hat{H}_2(f)$ is the estimated value of the second comprehensive response $H_2(f)$.

404: The signal processing apparatus calculates a self-interference signal according to the estimated value of the first comprehensive response, the estimated value of the second comprehensive response, the basic reference signal, and the image reference signal, so that the signal processing apparatus performs self-interference cancellation on the frequency-domain baseband signal.

Specifically, the signal processing apparatus can calculate $\hat{Z}(f)$ according to a fifth formula:

$$\hat{Z}(f) = \hat{H}_1(f)S(f) + \hat{H}_2(f)S^*(-f),$$

so that the signal processing apparatus performs self-interference cancellation on the frequency-domain baseband signal, where $\hat{Z}(f)$ is a frequency-domain self-interference signal, $\hat{H}_1(f)$ is the estimated value of the first comprehensive frequency-domain response, $\hat{H}_2(f)$ is the estimated value of the second comprehensive frequency-domain response, $S(f)$ is the basic frequency-domain reference signal, and $S^*(-f)$ is the image frequency-domain reference signal.

It should be noted that the first formula, as an implementation basis of the optional solution in step 403, can be deduced from the following process:

When IQ imbalance exists in a signal transmitter, a sent frequency-domain baseband signal with IQ imbalance may be expressed by using a first reference formula:

$$X(f) = G_1(f)S(f) + G_2(f)S^*(-f),$$

where $S(f)$ is the basic frequency-domain reference signal, $S^*(-f)$ is the image frequency-domain reference signal, and $G_1(f)$ and $G_2(f)$ are frequency responses that include IQ channel amplitude and phase imbalance of the signal transmitter.

When no IQ imbalance exists in the signal receiver, a self-interference signal $Z(f)$ in a received frequency-domain baseband signal may be expressed by using a second reference formula $Z(f)=G_1(f)H(f)S(f)+G_2(f)H(f)S^*(-f)$, where $H(f)$ is a frequency response of a self-interference channel.

When IQ imbalance also exists in the signal receiver, it can be learned according to the second reference formula that a self-interference signal $Z(f)$ in a frequency-domain baseband signal received by the signal receiver may be expressed as a third reference formula $Z(f)=K_1(f)H(f)X(f)+K_2(f)H^*(-f)X^*(-f)$, where $K_1(f)$ and $K_2(f)$ are frequency responses that include IQ channel amplitude and phase imbalance of the signal receiver, and $X(f)$ is a frequency-domain baseband signal with IQ imbalance that is sent by a signal transmitter.

A fourth reference formula can be obtained by substituting the first reference formula:

$$X(f)=G_1(f)S(f)+G_2(f)S^*(-f)$$

into the third reference formula:

$$Z(f)=K_1(f)H(f)X(f)+K_2(f)H^*(-f)X^*(-f):$$

$$Z(f)=[K_1(f)H(f)G_1(f)+K_2(f)H^*(-f)G_2^*(-f)]S(f)+[K_1(f)H(f)G_2(f)+K_2(f)H^*(-f)G_1^*(-f)]S^*(-f),$$

where in the fourth reference formula, let $$H_1(f)=K_1(f)H(f)G_1(f)+K_2(f)H^*(-f)G_2^*(-f), \text{ and}$$

$$H_2(f)=K_1(f)H(f)G_2(f)+K_2(f)H^*(-f)G_1^*(-f).$$

to obtain the first formula:

$$Z(f)=H_1(f)S(f)+H_2(f)S^*(-f),$$

where $Z(f)$ is the self-interference signal in the frequency-domain baseband signal received by the signal receiver, which is the same as the frequency-domain self-interference reference signal, $H_1(f)$ is the first comprehensive frequency-domain response, $H_2(f)$ is the second comprehensive frequency-domain response, $S(f)$ is the basic frequency-domain reference signal, and $S^*(-f)$ is the image frequency-domain reference signal.

According to the signal processing method provided in this embodiment, by means of analysis of a self-interference reference signal and a digital baseband signal, a self-interference signal affected by IQ imbalance can be calculated and used for self-interference cancellation, so as to implement self-interference cancellation when IQ imbalance exits in a communications system, which improves digital interference cancellation performance.

According to the foregoing embodiment, it can be known that this embodiment can be directly applied to a circumstance in which IQ imbalance exists on both a signal transmitter and a signal receiver that communicate with each other in a wireless full-duplex system, and a characteristic is that the signal processing apparatus acquires a digital baseband reference signal without IQ imbalance, a self-interference reference signal with IQ imbalance, and a frequency-domain baseband signal with IQ imbalance. Finally, a self-interference signal with IQ imbalance is calculated, so that the signal processing apparatus performs self-interference cancellation on the frequency-domain baseband signal.

According to the foregoing embodiment, it can also be known that, a flexible embodiment of this embodiment may also be specifically applied to a circumstance in which IQ imbalance exists on both a signal transmitter and a signal receiver that communicate with each other in a wireless full-duplex system in an MIMO (multiple-input multiple-output) scenario. In an example of a receive antenna in a wireless full-duplex system in a scenario of 2×2 MIMO (2×2 Multiple-Input Multiple-Output, multiple-input multiple-output of dual transmit antennas and dual receive antennas), the following content is included.

According to step 401, the signal processing apparatus acquires a digital baseband reference signal without IQ imbalance, a self-interference reference signal $Z(f)$ with IQ imbalance, and a frequency-domain baseband signal with IQ imbalance. The self-interference reference signal includes at least one of a frequency-domain self-interference reference signal $Z(f)$ or a time-domain self-interference reference signal $Z(t)$.

According to step 402, the signal processing apparatus obtains a first basic frequency-domain reference signal $S(f)$, a first image frequency-domain reference signal $S^*(-f)$, a second basic frequency-domain reference signal $Y(f)$, and a second image frequency-domain reference signal $Y^*(-f)$ according to the digital baseband reference signal.

The first basic frequency-domain reference signal $S(f)$ and the first image frequency-domain reference signal $S^*(-f)$ may be acquired from a first signal receive link in a scenario of 2×2 MIMO, and the second basic frequency-domain reference signal $Y(f)$ and the second image frequency-domain reference signal $Y^*(-f)$ may be signals acquired from a second signal receive link in a scenario of 2×2 MIMO. A relationship between the second basic frequency-domain reference signal $Y(f)$ and the second image frequency-domain reference signal $Y^*(-f)$ is similar to a relationship between $S(f)$ and $S^*(-f)$, obtaining of $Y(f)$ is similar to that of $S(f)$, and obtaining of $Y^*(-f)$ is similar to that of $S^*(-f)$. If what are acquired are the basic time-domain reference signal and the image time-domain reference signal, acquiring methods are similar to the obtaining method. Obtaining various frequency-domain signals is mainly used as an example for description in the following.

According to step 403 and an optional solution thereof, the signal processing apparatus estimates an estimated value $\hat{H}_1(f)$ of a first comprehensive response $H_1(f)$, an estimated value $\hat{H}_2(f)$ of a second comprehensive response $H_2(f)$, an estimated value $\hat{H}_3(f)$ of a third comprehensive response $H_3(f)$, and an estimated value $\hat{H}_4(f)$ of a fourth comprehensive response $H_4(f)$ according to the first basic frequency-domain reference signal $S(f)$, the first image frequency-domain reference signal $S^*(-f)$, the second basic frequency-domain reference signal $Y(f)$, the second image frequency-domain reference signal $Y^*(-f)$, and the self-interference reference signal $Z(f)$.

Optionally, when obtaining the first basic frequency-domain reference signal $S(f)$, the first image frequency-domain reference signal $S^*(-f)$, the second basic frequency-domain reference signal $Y(f)$, the second image frequency-domain reference signal $Y^*(-f)$, and the frequency-domain self-interference reference signal $Z(f)$, the signal processing apparatus can estimate the estimated value $\hat{H}_1(f)$ of $H_1(f)$, the estimated value $\hat{H}_2(f)$ of $H_2(f)$, the estimated value $\hat{H}_3(f)$ of $H_3(f)$, and the estimated value $\hat{H}_4(f)$ of $H_4(f)$ according to a sixth formula:

$$Z(f)=H_1(f)S(f)+H_2(f)S^*(-f)+H_3(f)Y(f)+H_4(f)Y^*(-f).$$

A deduction process of the sixth formula:

$$Z(f)=H_1(f)S(f)+H_2(f)S^*(-f)+H_3(f)Y(f)+H_4(f)Y^*(-f)$$

is similar to a deduction process of the first formula:

$$Z(f)=H_1(f)S(f)+H_2(f)S^*(-f).$$

Optionally, when obtaining a first basic time-domain reference signal, a first image time-domain reference signal, a second basic time-domain reference signal, a second image time-domain reference signal, and the time-domain self-interference reference signal Z(t), the signal processing apparatus estimates an estimated value $\hat{H}_1(t)$ of $H_1(t)$, an estimated value $\hat{H}_2(t)$ of $H_2(t)$, an estimated value $\hat{H}_3(t)$ of $H_3(t)$, and an estimated value $\hat{H}_4(t)$ of $H_4(t)$ according to another expression, for example, a sixth substitution formula:

$$Z(t)=H_1(t)\otimes S(t)+H_2(t)\otimes S^*(-t)+H_3(t)\otimes Y(t)+H_4(t)\otimes Y^*(-t)$$

obtained after time-domain conversion is performed on the sixth formula.

Usage of the sixth formula is similar to that of the first formula, a relationship between $\hat{H}_3(t)$ and $\hat{H}_3(f)$ is similar to a relationship between $\hat{H}_1(t)$ and $\hat{H}_1(f)$, a relationship between $\hat{H}_2(t)$ and $\hat{H}_2(f)$ is similar to a relationship between $\hat{H}_4(t)$ and $\hat{H}_4(f)$, a relationship between Y(t) and Y(f) is similar to a relationship between s(t) and S(f), a relationship between $Y^*(-t)$ and $Y^*(-f)$ is similar to a relationship between $s^*(-t)$ and $S^*(-f)$, and Z(t) is similar to Z(f), where Z(f) may be a Fourier transform value of Z(t), and Z(f) is the frequency-domain self-interference reference signal.

According to step 403 and the specific detailed step 4032, the signal processing apparatus can let $S'(f)=S^*(-f)$ and $Y'(f)=Y^*(-f)$ according to the sixth formula:

$$Z(f)=H_1(f)S(f)+H_2(f)S^*(-f)+H_3(f)Y(f)+H_4(f)Y^*(-f)$$

to calculate an $N^{th}$-order system of linear equations, which is written in a matrix form:

$$\begin{bmatrix} \{Z(f)\}_i \\ \{Z(f)\}_{i+1} \\ \vdots \\ \{Z(f)\}_{i+N-1} \end{bmatrix} =$$

$$\begin{bmatrix} \{S(f)\}_i & \{S'(f)\}_i & \{Y(f)\}_i & \{Y'(f)\}_i \\ \{S(f)\}_{i+1} & \{S'(f)\}_{i+1} & \{Y(f)\}_{i+1} & \{Y'(f)\}_{i+1} \\ \vdots & \vdots & \vdots & \vdots \\ \{S(f)\}_{i+N-1} & \{S'(f)\}_{i+N-1} & \{Y(f)\}_{i+N-1} & \{Y'(f)\}_{i+N-1} \end{bmatrix} \begin{bmatrix} H_1(f) \\ H_2(f) \\ H_3(f) \\ H_4(f) \end{bmatrix},$$

and is expressed as Z(f)=S(f)H(f), where $$Z(f) = \begin{bmatrix} \{Z(f)\}_i \\ \{Z(f)\}_{i+1} \\ \vdots \\ \{Z(f)\}_{i+N-1} \end{bmatrix},$$

$$S(f) = \begin{bmatrix} \{S(f)\}_i & \{S'(f)\}_i & \{Y(f)\}_i & \{Y'(f)\}_i \\ \{S(f)\}_{i+1} & \{S'(f)\}_{i+1} & \{Y(f)\}_{i+1} & \{Y'(f)\}_{i+1} \\ \vdots & \vdots & \vdots & \vdots \\ \{S(f)\}_{i+N-1} & \{S'(f)\}_{i+N-1} & \{Y(f)\}_{i+N-1} & \{Y'(f)\}_{i+N-1} \end{bmatrix}, \text{ and}$$

$$H(f) = \begin{bmatrix} H_1(f) \\ H_2(f) \\ H_3(f) \\ H_4(f) \end{bmatrix}.$$

According to step 4033a, the foregoing matrices Z(f), S(f), and H(f) in this embodiment are substituted into a third formula:

$$\hat{H}(f) = \underset{H(f)}{\operatorname{argmin}} \|Z(f) - S(f)H(f)\|^2$$

to calculate a fourth formula:

$$\hat{H}(f)=[S^H(f)S(f)]^{-1}S^H(f)Z(f), \text{ where}$$

$$\hat{H}(f) = \begin{bmatrix} \hat{H}_1(f) \\ \hat{H}_2(f) \\ \hat{H}_3(f) \\ \hat{H}_4(f) \end{bmatrix}.$$

According to step 4034a, $\hat{H}_1(f)$, $\hat{H}_2(f)$, $\hat{H}_3(f)$, and $\hat{H}_4(f)$ are calculated with reference to the fourth formula:

$$\hat{H}(f)=[S^H(f)S(f)]^{-1}S^H(f)Z(f) \text{ and}$$

$$\hat{H}(f) = \begin{bmatrix} \hat{H}_1(f) \\ \hat{H}_2(f) \\ \hat{H}_3(f) \\ \hat{H}_4(f) \end{bmatrix}.$$

Optionally, the foregoing work that is completed according to step 4033a and step 4034a may also be specifically implemented according to step 4033b and step 4034b:

According to step 4033b, the signal processing apparatus substitutes the matrices Z(f), S(f), and H(f) into a third substitution formula:

$$\hat{H}(f) = \underset{H(f)}{\operatorname{argmin}} \sum_{i=0}^{n} \lambda^{n-i} \|\{Z(f)\}_i - \{S(f)\}_i \{H(f)\}_i\|^2,$$

to calculate a fourth substitution formula:

$$\hat{H}(f) = \left[\sum_{i=0}^{n} \lambda^{n-i} \{S^H(f)\}_i \{S(f)\}_i\right]^{-1} \left[\sum_{i=0}^{n} \lambda^{n-i} \{S^H(f)\}_i \{Z(f)\}_i\right],$$

where $0<\lambda<1$, which is a forgetting factor in an RLS (Recursive least-square) algorithm, $$\{Z(f)\}_i = \begin{bmatrix} \{Z(f)\}_i \\ \{Z(f)\}_{i+1} \\ M \\ \{Z(f)\}_{i+N-1} \end{bmatrix},$$

$$\{S(f)\} = \begin{bmatrix} \{S(f)\}_i & \{S'(f)\}_i & \{Y(f)\}_i & \{Y'(f)\}_i \\ \{S(f)\}_{i+1} & \{S'(f)\}_{i+1} & \{Y(f)\}_{i+1} & \{Y'(f)\}_{i+1} \\ \vdots & \vdots & \vdots & \vdots \\ \{S(f)\}_{i+N-1} & \{S'(f)\}_{i+N-1} & \{Y(f)\}_{i+N-1} & \{Y'(f)\}_{i+N-1} \end{bmatrix}, \text{ and}$$

-continued $$\hat{H}(f) = \begin{bmatrix} \hat{H}_1(f) \\ \hat{H}_2(f) \\ \hat{H}_3(f) \\ \hat{H}_4(f) \end{bmatrix}.$$

According to step 4034b, the signal processing apparatus calculates $\hat{H}_1(f)$, $\hat{H}_2(f)$, $\hat{H}_3(f)$, and $\hat{H}_4(f)$ with reference to the fourth substitution formula:

$$\hat{H}(f) = \left[\sum_{i=0}^{n} \lambda^{n-i} \{S^H(f)\}_i \{S(f)\}_i\right]^{-1} \left[\sum_{i=0}^{n} \lambda^{n-i} \{S^H(f)\}_i \{Z(f)\}_i\right] \text{ and}$$

$$\hat{H}(f) = \begin{bmatrix} \hat{H}_1(f) \\ \hat{H}_2(f) \\ \hat{H}_3(f) \\ \hat{H}_4(f) \end{bmatrix}.$$

Herein, it should be noted that, all other work content of obtaining the first expression by calculation according to step 4033, so that the signal processing apparatus calculates $\hat{H}_1(f)$, $\hat{H}_2 f$, $\hat{H}_3(f)$, and $\hat{H}_4(f)$ according to step 4034 and with reference to the first expression and $$\hat{H}(f) = \begin{bmatrix} \hat{H}_1(f) \\ \hat{H}_2(f) \\ \hat{H}_3(f) \\ \hat{H}_4(f) \end{bmatrix}$$

can also be covered in the embodiments.

Finally, according to step 404 and the foregoing content of this embodiment, the signal processing apparatus calculates a frequency-domain self-interference signal $\hat{Z}(f)$ with IQ imbalance according to $\hat{H}_1(f)$, $\hat{H}_2(f)$, $\hat{H}_3(f)$, $\hat{H}_4(f)$, S(f), S*(−f), Y(f), and Y*(−f) and with reference to the sixth formula and a variation, so that the signal processing apparatus performs self-interference cancellation on the frequency-domain baseband signal.

It can be known from the foregoing that, according to the signal processing method provided by this embodiment, a self-interference signal affected by IQ imbalance in a wireless full-duplex system in a multiple-input multiple-output scenario can be calculated and used for self-interference cancellation, so as to implement self-interference cancellation when IQ imbalance exists on at least one of a signal transmitter or a signal receiver that communicate with each other in the wireless full-duplex system, which improves digital interference cancellation performance of the wireless full-duplex system.

The foregoing descriptions are merely specific implementation manners of the embodiments, but are not intended to limit the protection scope of the embodiments. Any variation or replacement readily figured out by a person skilled in the art within the technical scope disclosed in the embodiments shall fall within the protection scope of the embodiments. Therefore, the protection scope of the embodiments shall be subject to the protection scope of the claims.

What is claimed is:

1. An apparatus comprising:
    a bus;
    a processor connected to the bus;
    a receiver connected to the processor over the bus, wherein the receiver is configured to acquire a digital baseband reference signal, a self-interference reference signal, and a frequency-domain baseband signal; and
    a non-transitory computer readable storage medium storing a program for execution by the processor, the program including instructions to:
        obtain a basic reference signal and an image reference signal according to the digital baseband reference signal acquired by the receiver, wherein the image reference signal is an image signal of the basic reference signal;
        estimate an estimated value of a first comprehensive response and an estimated value of a second comprehensive response according to the basic reference signal obtained by the processor, the image reference signal obtained by the processor, and the self-interference reference signal acquired by the receiver;
        calculate a self-interference signal according to the estimated value of the first comprehensive response estimated by the processor, the estimated value of the second comprehensive response estimated by the processor, the basic reference signal obtained by the processor, and the image reference signal obtained by the processor, so that the apparatus is configured to perform self-interference cancellation on the frequency-domain baseband signal acquired by the receiver, wherein the basic reference signal comprises a basic frequency-domain reference signal, the image reference signal comprises an image frequency-domain reference signal, the first comprehensive response comprises a first comprehensive frequency-domain response, the second comprehensive response comprises a second comprehensive frequency-domain response, and the self-interference reference signal comprises a frequency-domain self-interference reference signal; and
        estimate an estimated value $\hat{H}_1(f)$ of $H_1(f)$ and an estimated value $\hat{H}_2(f)$ of $H_2(f)$ according to a first formula:

$$Z(f)=H_1(f)S(f)+H_2(f)S^*(-f)$$

wherein S(f) is the basic frequency-domain reference signal obtained by the processor, S*(−f) is the image frequency-domain reference signal obtained by the processor, Z(f) is the frequency-domain self-interference reference signal acquired by the receiver, $H_1(f)$ is a first comprehensive frequency-domain response, $\hat{H}_1(f)$ is the estimated value of the first comprehensive frequency-domain response, $H_1(f)$, $H_2(f)$ is the second comprehensive frequency-domain response, and $\hat{H}_2(f)$ is the estimated value of the second comprehensive frequency-domain response $H_2(f)$.

2. The apparatus according to claim 1, wherein the instructions further comprise instructions to:
    acquire a second formula:

$$\{Z(f)\}_i=H_1(f)\{S(f)\}_i+H_2(f)\{S'(f)\}_i,$$

according to the first formula:

$$Z(f)=H_1(f)S(f)+H_2(f)S^*(-f),$$

wherein the second formula is a relational expression about S(f) and S*(−f) of an $i^{th}$ frame acquired by the processor and Z(f) of an $i^{th}$ frame acquired by the receiver, and $$S'(f)=S^*(-f);$$

substitute S(f) and S*(−f), acquired by the processor, of N frames from the $i^{th}$ frame and Z(f), acquired by the receiver, of the N frames from the $i^{th}$ frame into the second formula:

$$\{Z(f)\}_i = H_1(f)\{S(f)\}_i + H_2(f)\{S'(f)\}_i,$$

to calculate an $N^{th}$-order system of linear equations:

$$Z(f) = S(f)H(f),$$

wherein $$Z(f) = \begin{bmatrix} \{Z(f)\}_i \\ \{Z(f)\}_{i+1} \\ M \\ \{Z(f)\}_{i+N-1} \end{bmatrix},$$

$$S(f) = \begin{bmatrix} \{S(f)\}_i & \{S'(f)\}_i \\ \{S(f)\}_{i+1} & \{S'(f)\}_{i+1} \\ M & M \\ \{S(f)\}_{i+N-1} & \{S'(f)\}_{i+N-1} \end{bmatrix}, \text{ and } H(f) = \begin{bmatrix} H_1(f) \\ H_2(f) \end{bmatrix};$$

calculate, according to the matrices Z(f), S(f), and H(f), an expression for expressing a relationship among Z(f), S(f), and Ĥ(f), wherein Ĥ(f) is an estimated value matrix of H(f), and $$\hat{H}(f) = \begin{bmatrix} \hat{H}_1(f) \\ \hat{H}_2(f) \end{bmatrix}; \text{ and}$$

calculate $\hat{H}_1(f)$ and $\hat{H}_2(f)$ with reference to the expression for expressing the relationship among Z(f), S(f), and Ĥ(f), calculated by the processor, and $$\hat{H}(f) = \begin{bmatrix} \hat{H}_1(f) \\ \hat{H}_2(f) \end{bmatrix}.$$

3. The apparatus according to claim 2, wherein the instructions further comprise instructions to:
 substitute the matrices Z(f), S(f), and H(f) into a third formula:

$$\hat{H}(f) = \underset{H(f)}{\operatorname{argmin}} \|Z(f) - S(f)H(f)\|^2,$$

to calculate a fourth formula:

$$\hat{H}(f) = [S^H(f)S(f)]^{-1}S^H(f)Z(f),$$

wherein $S^H(f)$ is a conjugate transpose matrix of S(f), and $$\hat{H}(f) = \begin{bmatrix} \hat{H}_1(f) \\ \hat{H}_2(f) \end{bmatrix}; \text{ and}$$

calculate $\hat{H}_1(f)$ and $\hat{H}_2(f)$ with reference to the fourth formula:

$$H(f) = [S^H(f)S(f)]^{-1}S^H(f)Z(f), \text{ and}$$

$$\hat{H}(f) = \begin{bmatrix} \hat{H}_1(f) \\ \hat{H}_2(f) \end{bmatrix}.$$

4. The apparatus according to claim 2, wherein the instructions further comprise instructions to:
 substitute the matrices Z(f), S(f), and H(f) into a third substitution formula:

$$\hat{H}(f) = \underset{H(f)}{\operatorname{argmin}} \sum_{i=0}^{n} \lambda^{n-i} \|\{Z(f)\}_i - \{S(f)\}_i\{H(f)\}_i\|^2,$$

to calculate a fourth substitution formula:

$$\hat{H}(f) = \left[\sum_{i=0}^{n} \lambda^{n-i}\{S^H(f)\}_i\{S(f)\}_i\right]^{-1} \left[\sum_{i=0}^{n} \lambda^{n-i}\{S^H(f)\}_i\{Z(f)\}_i\right],$$

wherein $0<\lambda<1$, $$\{Z(f)\}_i = \begin{bmatrix} \{Z(f)\}_i \\ \{Z(f)\}_{i+1} \\ M \\ \{Z(f)\}_{i+N-1} \end{bmatrix},$$

$$\{S(f)\}_i = \begin{bmatrix} \{S(f)\}_i & \{S'(f)\}_i \\ \{S(f)\}_{i+1} & \{S'(f)\}_{i+1} \\ M & M \\ \{S(f)\}_{i+N-1} & \{S'(f)\}_{i+N-1} \end{bmatrix},$$

$S^H(f)$ is a conjugate transpose matrix of S(f), and $$\hat{H}(f) = \begin{bmatrix} \hat{H}_1(f) \\ \hat{H}_2(f) \end{bmatrix}; \text{ and}$$

calculate $\hat{H}_1(f)$ and $\hat{H}_2(f)$ with reference to the fourth substitution formula:

$$\hat{H}(f) = \left[\sum_{i=0}^{n} \lambda^{n-i}\{S^H(f)\}_i\{S(f)\}_i\right]^{-1} \left[\sum_{i=0}^{n} \lambda^{n-i}\{S^H(f)\}_i\{Z(f)\}_i\right], \text{ and}$$

$$\hat{H}(f) = \begin{bmatrix} \hat{H}_1(f) \\ \hat{H}_2(f) \end{bmatrix}.$$

5. The apparatus according to claim 1, wherein the basic reference signal comprises a basic time-domain reference signal, the image reference signal comprises an image time-domain reference signal, the first comprehensive response comprises a first comprehensive time-domain response, the second comprehensive response comprises a second comprehensive time-domain response, and the self-interference reference signal comprises a time-domain self-interference reference signal, and wherein the instructions further comprise instructions to
- estimate an estimated value $\tilde{H}_1(f)$ of $H_1(f)$ and an estimated value $\hat{H}_2(f)$ of $H_2(f)$ according to a first substitution formula:

$$Z(t)=H_1(t)\otimes S(t)+H_2(t)\otimes S^*(-t)$$

wherein s(t) is the basic time-domain reference signal obtained by the processor, s*(−t) is the image time-domain reference signal obtained by the processor, Z(t) is the time-domain self-interference reference signal acquired by the receiver, $H_1(t)$ is the first comprehensive time-domain response, and $H_2(t)$ is the second comprehensive time-domain response, wherein $H_1(f)$ is a Fourier transform value of $H_1(t)$, and $H_2(f)$ is a Fourier transform value of $H_2(t)$; and
- wherein $H_1(f)$ is a first comprehensive frequency-domain response, $\hat{H}_1(f)$ is an estimated value of the first comprehensive frequency-domain response $H_1(f)$, $H_2(f)$ is a second comprehensive frequency-domain response, and $\hat{H}_2(f)$ is an estimated value of the second comprehensive frequency-domain response $H_2(f)$.

6. The apparatus according to claim 5, wherein the instructions further comprise instructions to:
- acquire a second formula:

$$\{Z(f)\}_i=H_1(f)\{S(f)\}_i+H_2(f)\{S'(f)\}_i$$

according to the first substitution formula:

$$Z(t)=H_1(t)\otimes S(t)+H_2(t)\otimes S^*(-t),$$

wherein the second formula is a relational expression about S(f) and S*(−f) of an $i^{th}$ frame acquired by the processor and Z(f) of an $i^{th}$ frame acquired by the receiver, S'(f)=S*(−f), Z(f) is a Fourier transform value of Z(t), and Z(f) is a frequency-domain self-interference reference signal;
- substitute S(f) and S*(−f), acquired by the processor, of N frames from the $i^{th}$ frame and Z(f), acquired by the receiver, of the N frames from the $i^{th}$ frame into the second formula:

$$\{Z(f)\}_i=H_1(f)\{S(f)\}_i+H_2(f)\{S'(f)\}_i$$

acquired by the processor, to calculate an $N^{th}$-order system of linear equations Z(f)=S(f)H(f), wherein $$Z(f) = \begin{bmatrix} \{Z(f)\}_i \\ \{Z(f)\}_{i+1} \\ M \\ \{Z(f)\}_{i+N-1} \end{bmatrix}, S(f) = \begin{bmatrix} \{S(f)\}_i & \{S'(f)\}_i \\ \{S(f)\}_{i+1} & \{S'(f)\}_{i+1} \\ M & M \\ \{S(f)\}_{i+N-1} & \{S'(f)\}_{i+N-1} \end{bmatrix}, \text{ and}$$

$$H(f) = \begin{bmatrix} H_1(f) \\ H_2(f) \end{bmatrix};$$

- calculate, according to the matrices Z(f), S(f), and H(f) calculated by the processor, an expression for expressing a relationship among Z(f), S(f), and $\hat{H}(f)$, wherein $\hat{H}(f)$ is an estimated value matrix of H(f), and $$\hat{H}(f) = \begin{bmatrix} \hat{H}_1(f) \\ \hat{H}_2(f) \end{bmatrix}; \text{ and}$$

- calculate $\hat{H}_1(f)$ and $\hat{H}_2(f)$ with reference to the expression for expressing the relationship among Z(f), S(f), and $\hat{H}(f)$ calculated by the processor and $$\hat{H}(f) = \begin{bmatrix} \hat{H}_1(f) \\ \hat{H}_2(f) \end{bmatrix}.$$

7. The apparatus according to claim 1, wherein the instructions further comprise instructions to calculate $\hat{Z}(f)$ according to a fifth formula:

$$\hat{Z}(f)=\hat{H}_1(f)S(f)+\hat{H}_2(f)S^*(-f),$$

so that the processor performs self-interference cancellation on the frequency-domain baseband signal; and
- wherein $\hat{Z}(f)$ is a frequency-domain self-interference signal, $\hat{H}_1(f)$ is the estimated value of a first comprehensive frequency-domain response estimated by the processor, $\hat{H}_2(f)$ is the estimated value of a second comprehensive frequency-domain response estimated by processor, S(f) is a basic frequency-domain reference signal obtained by the processor, and S*(−f) is the image frequency-domain reference signal obtained by the processor.

8. A method comprising:
- acquiring, by a signal processing apparatus, a digital baseband reference signal, a self-interference reference signal, and a frequency-domain baseband signal;
- obtaining, by the signal processing apparatus, a basic reference signal and an image reference signal according to the digital baseband reference signal, wherein the image reference signal is an image signal of the basic reference signal;
- estimating, by the signal processing apparatus, an estimated value of a first comprehensive response and an estimated value of a second comprehensive response according to the basic reference signal, the image reference signal, and the self-interference reference signal; and
- calculating, by the signal processing apparatus, a self-interference signal according to the estimated value of the first comprehensive response, the estimated value of the second comprehensive response, the basic reference signal, and the image reference signal, so that the signal processing apparatus performs self-interference cancellation on the frequency-domain baseband signal,
- wherein the basic reference signal comprises a basic frequency-domain reference signal, the image reference signal comprises an image frequency-domain reference signal, the first comprehensive response comprises a first comprehensive frequency-domain response, the second comprehensive response comprises a second comprehensive frequency-domain response, and the self-interference reference signal comprises a frequency-domain self-interference reference signal,
- wherein estimating, by the signal processing apparatus, the estimated value of the first comprehensive response and the estimated value of a second comprehensive response according to the basic reference signal, the image reference signal, and the self-interference reference signal comprises
- estimating, by the signal processing apparatus, an estimated value $\hat{H}_1(f)$ of $H_1(f)$ and an estimated value $\hat{H}_2(f)$ of $H_2$ (n according to a first formula:

$$Z(f)=H_1(f)S(f)+H_2(f)S^*(-f), \text{ and}$$

wherein S(f) is the basic frequency-domain reference signal, S*(−f) is the image frequency-domain reference signal, Z(f) is the frequency-domain self-interference reference signal, $H_1(f)$ is a first comprehensive frequency-domain response, $\hat{H}_1(f)$ is the estimated value of the first comprehensive frequency-domain response $H_1(f)$, $H_2(f)$ is the second comprehensive frequency-domain response, and $\hat{H}_2(f)$ is the estimated value of the second comprehensive frequency-domain response $H_2(f)$.

9. The method according to claim 8, wherein estimating, by the signal processing apparatus, the estimated value $\hat{H}_1(f)$ of $H_1(f)$ and the estimated value $\hat{H}_2(f)$ of $H_2(f)$ according to the first formula $$Z(f)=H_1(f)S(f)+H_2(f)S^*(-f)$$

comprises:
acquiring, by the signal processing apparatus, a second formula:

$$\{Z(f)\}_i = H_1(f)\{S(f)\}_i + H_2(f)\{S'(f)\}_i$$

according to the first formula:

$$Z(f)=H_1(f)S(f)+H_2(f)S^*(-f),$$

wherein the second formula is a relational expression about S(f), S*(−f), and Z(f) of an $i^{th}$ frame acquired by the signal processing apparatus, and S'(f)=S*(−f)
successively substituting S(f), S*(−f), and Z(f), acquired by the signal processing apparatus, of N frames from the $i^{th}$ frame into the second formula:

$$\{Z(f)\}_i = H_1(f)\{S(f)\}_i + H_2(f)\{S'(f)\}_i,$$

to calculate an $N^{th}$-order system of linear equations:

$$Z(f)=S(f)H(f)$$

wherein $$Z(f) = \begin{bmatrix} \{Z(f)\}_i \\ \{Z(f)\}_{i+1} \\ M \\ \{Z(f)\}_{i+N-1} \end{bmatrix}, S(f) = \begin{bmatrix} \{S(f)\}_i & \{S'(f)\}_i \\ \{S(f)\}_{i+1} & \{S'(f)\}_{i+1} \\ M & M \\ \{S(f)\}_{i+N-1} & \{S'(f)\}_{i+N-1} \end{bmatrix}, \text{ and}$$

$$H(f) = \begin{bmatrix} H_1(f) \\ H_2(f) \end{bmatrix};$$

calculating, by the signal processing apparatus according to the matrices Z(f), S(f), and H(f), an expression for expressing a relationship among Z(f), S(f), and $\hat{H}(f)$, and
wherein $\hat{H}(f)$ is an estimated value matrix of H(f), and $$\hat{H}(f) = \begin{bmatrix} \hat{H}_1(f) \\ \hat{H}_2(f) \end{bmatrix}; \text{ and}$$

calculating, by the signal processing apparatus, $\hat{H}_1(f)$ and $\hat{H}_2(f)$ with reference to the expression for expressing the relationship among Z(f), S(f), H(f), and $$\hat{H}(f) = \begin{bmatrix} \hat{H}_1(f) \\ \hat{H}_2(f) \end{bmatrix}.$$

10. The method according to claim 9, wherein calculating, by the signal processing apparatus according to the matrices Z(f), S(f), and H(f), an expression for expressing a relationship among Z(f), S(f), and $\hat{H}(f)$, wherein $\hat{H}(f)$ is an estimated value matrix of H(f), and $$\hat{H}(f) = \begin{bmatrix} \hat{H}_1(f) \\ \hat{H}_2(f) \end{bmatrix},$$

specifically comprises
substituting, by the signal processing apparatus, the matrices Z(f), S(f), and H(f) into a third substitution formula $$\hat{H}(f) = \arg\min_{H(f)} \sum_{i=0}^{n} \lambda^{n-i} \|\{Z(f)\}_i - \{S(f)\}_i \{H(f)\}_i\|^2,$$

to calculate a fourth substitution formula $$\hat{H}(f) = \left[\sum_{i=0}^{n} \lambda^{n-i} \{S^H(f)\}_i \{S(f)\}_i\right]^{-1} \left[\sum_{i=0}^{n} \lambda^{n-i} \{S^H(f)\}_i \{Z(f)\}_i\right],$$

wherein $0 < \lambda < 1$, $\{Z(f)\}_i = \begin{bmatrix} \{Z(f)\}_i \\ \{Z(f)\}_{i+1} \\ M \\ \{Z(f)\}_{i+N-1} \end{bmatrix},$ $$\{S(f)\}_i = \begin{bmatrix} \{S(f)\}_i & \{S'(f)\}_i \\ \{S(f)\}_{i+1} & \{S'(f)\}_{i+1} \\ M & M \\ \{S(f)\}_{i+N-1} & \{S'(f)\}_{i+N-1} \end{bmatrix},$$

$S^H(f)$ is a conjugate transpose matrix of S(f), and $$\hat{H}(f) = \begin{bmatrix} \hat{H}_1(f) \\ \hat{H}_2(f) \end{bmatrix}, \text{ and}$$

wherein calculating, by the signal processing apparatus, $\hat{H}_1(f)$ and $\hat{H}_2(f)$ with reference to the expression for expressing the relationship among Z(f), S(f), and $\hat{H}(f)$ and $$\hat{H}(f) = \begin{bmatrix} \hat{H}_1(f) \\ \hat{H}_2(f) \end{bmatrix}$$

specifically comprises
calculating, by the signal processing apparatus, $\hat{H}_1(f)$ and $\hat{H}_2(f)$ with reference to the fourth substitution formula $$\hat{H}(f) = \left[\sum_{i=0}^{n} \lambda^{n-i} \{S^H(f)\}_i \{S(f)\}_i\right]^{-1} \left[\sum_{i=0}^{n} \lambda^{n-i} \{S^H(f)\}_i \{Z(f)\}_i\right] \text{ and}$$

$$\hat{H}(f) = \begin{bmatrix} \hat{H}_1(f) \\ \hat{H}_2(f) \end{bmatrix}.$$

11. The method according to claim 9, wherein calculating, by the signal processing apparatus according to the matrices Z(f), S(f), and H(f), an expression for expressing a relationship among Z(f), S(f), and Ĥ(f), wherein Ĥ(f) is an estimated value matrix of H(f), and $$\hat{H}(f) = \begin{bmatrix} \hat{H}_1(f) \\ \hat{H}_2(f) \end{bmatrix},$$

specifically comprises
substituting, by the signal processing apparatus, the matrices Z(f), S(f), and H(f) into a third formula $$\hat{H}(f) = \underset{H(f)}{\mathrm{argmin}} \|Z(f) - S(f)H(f)\|^2,$$

to calculate a fourth formula $\hat{H}(f) = [S^H(f)S(f)]^{-1}S^H(f)Z(f)$, wherein $S^H(f)$ is a conjugate transpose matrix of S(f), and $$\hat{H}(f) = \begin{bmatrix} \hat{H}_1(f) \\ \hat{H}_2(f) \end{bmatrix}, \text{ and}$$

wherein calculating, by the signal processing apparatus, $\hat{H}_1(f)$ and $\hat{H}_2(f)$ with reference to the expression for expressing the relationship among Z(f), S(f), Ĥ(f), and $$\hat{H}(f) = \begin{bmatrix} \hat{H}_1(f) \\ \hat{H}_2(f) \end{bmatrix}$$

specifically comprises
calculating, by the signal processing apparatus, $\hat{H}_1(f)$ and $\hat{H}_2(f)$ with reference to the fourth formula $\hat{H}(f) = [S^H(f)S(f)]^{-1}S^H(f)Z(f)$ and $$\hat{H}(f) = \begin{bmatrix} \hat{H}_1(f) \\ \hat{H}_2(f) \end{bmatrix}.$$

12. The method according to claim 8,
wherein the basic reference signal comprises a basic time-domain reference signal, the image reference signal comprises an image time-domain reference signal, the first comprehensive response comprises a first comprehensive time-domain response, the second comprehensive response comprises a second comprehensive time-domain response, and the self-interference reference signal comprises a time-domain self-interference reference signal,
wherein estimating, by the signal processing apparatus, the estimated value of the first comprehensive response and the estimated value of the second comprehensive response according to the basic frequency-domain reference signal, the image frequency-domain reference signal, and the self-interference reference signal comprises
estimating, by the signal processing apparatus, an estimated value $\hat{H}_1(f)$ of $H_1(f)$ and an estimated value $\hat{H}_2(f)$ of $H_2(f)$ according to a first substitution formula:

$Z(t)=H_1(t)\otimes S(t)+H_2(t)\otimes S^*(-t)$, wherein s(t) is the basic time-domain reference signal, s*(-t) is the image time-domain reference signal, Z(t) is the time-domain self-interference reference signal, $H_1(t)$ is the first comprehensive time-domain response, and $H_2(t)$ is the second comprehensive time-domain response, wherein $H_1(f)$ is a Fourier transform value of $H_1(t)$, and $H_2(f)$ is a Fourier transform value of $H_2(t)$, and wherein $H_1(f)$ is a first comprehensive frequency-domain response, $\hat{H}_1(f)$ is an estimated value of the first comprehensive frequency-domain response $H_1(f)$, $H_2(f)$ is a second comprehensive frequency-domain response, and $\hat{H}_2(f)$ is an estimated value of the second comprehensive frequency-domain response $H_2(f)$.

13. The method according to claim 12,
wherein estimating, by the signal processing apparatus, the estimated value $\hat{H}_1(f)$ of $H_1(f)$ and an estimated value $\hat{H}_2(f)$ of $H_2(f)$ according to a first substitution formula:

$Z(t)=H_1(t)\otimes S(t)+H_2(t)\otimes S^*(-t)$, comprises:
acquiring, by the signal processing apparatus, a second formula:

$\{Z(f)\}_i=H_1(f)\{S(f)\}_i+H_2(f)\{S'(f)\}_i$ according to the first substitution formula:

$Z(t)=H_1(t)\otimes S(t)+H_2(t)\otimes S^*(-t)$, and wherein the second formula is a relational expression about S(f), S*(-f), and Z(f) of an $i^{th}$ frame acquired by the signal processing apparatus, S'(f)=S*(-f), Z(f) is a Fourier transform value of Z(t), and Z(f) is a frequency-domain self-interference reference signal;
successively substituting S(f), S*(-f), and Z(f), acquired by the signal processing apparatus, of N frames from the $i^{th}$ frame into the second formula:

$\{Z(f)\}_i=H_1(f)\{S(f)\}_i+H_2(f)\{S'(f)\}_i$, to calculate an $N^{th}$-order system of linear equations Z(f)=S(f)H(f), wherein $$Z(f) = \begin{bmatrix} \{Z(f)\}_i \\ \{Z(f)\}_{i+1} \\ M \\ \{Z(f)\}_{i+N-1} \end{bmatrix},$$

$$S(f) = \begin{bmatrix} \{S(f)\}_i & \{S'(f)\}_i \\ \{S(f)\}_{i+1} & \{S'(f)\}_{i+1} \\ M & M \\ \{S(f)\}_{i+N-1} & \{S'(f)\}_{i+N-1} \end{bmatrix}, \text{ and } H(f) = \begin{bmatrix} H_1(f) \\ H_2(f) \end{bmatrix};$$

calculating, by the signal processing apparatus according to the matrices Z(f), S(f), and H(f), an expression for expressing a relationship among Z(f), S(f), and Ĥ(f), wherein Ĥ(f) is an estimated value matrix of H(f), and $$\hat{H}(f) = \begin{bmatrix} \hat{H}_1(f) \\ \hat{H}_2(f) \end{bmatrix}; \text{ and}$$

calculating, by the signal processing apparatus, $\hat{H}_1(f)$ and $\hat{H}_2(f)$ with reference to the expression for expressing the relationship among Z(f), S(f), Ĥ(f), and $$\hat{H}(f) = \begin{bmatrix} \hat{H}_1(f) \\ \hat{H}_2(f) \end{bmatrix}.$$

14. The method according to claim 8, wherein calculating, by the signal processing apparatus, the self-interference signal according to the estimated value of the first comprehensive response, the estimated value of the second comprehensive response, the basic reference signal, and the image reference signal, so that the signal processing apparatus performs self-interference cancellation on the frequency-domain baseband signal, comprises calculating, by the signal processing apparatus, $\hat{Z}(f)$ according to a fifth formula:

$$\hat{Z}(f) = \hat{H}_1(f)S(f) + \hat{H}_2(f)S^*(-f),$$

so that the signal processing apparatus performs self-interference cancellation on the frequency-domain baseband signal, wherein $\hat{Z}(f)$ is a frequency-domain self-interference signal, $\hat{H}_1(f)$ is the estimated value of the first comprehensive frequency-domain response, $\hat{H}_2(f)$ is the estimated value of the second comprehensive frequency-domain response, $S(f)$ is the basic frequency-domain reference signal, and $S^*(-f)$ is the image frequency-domain reference signal.

15. A non-transitory computer readable storage medium storing a program for execution by a processor, the program including instructions to:

acquire, by a receiver, a digital baseband reference signal, a self-interference reference signal, and a frequency-domain baseband signal;

obtain a basic reference signal and an image reference signal according to the digital baseband reference signal acquired by the receiver, wherein the image reference signal is an image signal of the basic reference signal;

estimate an estimated value of a first comprehensive response and an estimated value of a second comprehensive response according to the basic reference signal obtained by the processor, the image reference signal obtained by the processor, and the self-interference reference signal acquired by the receiver; and calculate a self-interference signal according to the estimated value of the first comprehensive response estimated by the processor, the estimated value of the second comprehensive response estimated by the processor, the basic reference signal obtained by the processor, and the image reference signal obtained by the processor, so that the processor performs self-interference cancellation on the frequency-domain baseband signal acquired by the receiver, wherein the basic reference signal comprises a basic frequency-domain reference signal, the image reference signal comprises an image frequency-domain reference signal, the first comprehensive response comprises a first comprehensive frequency-domain response, the second comprehensive response comprises a second comprehensive frequency-domain response, and the self-interference reference signal comprises a frequency-domain self-interference reference signal, wherein to estimate the estimated value of the first comprehensive response and the estimated value of a second comprehensive response according to the basic reference signal, the image reference signal, and the self-interference reference signal comprises to estimate an estimated value $\hat{H}_1(f)$ of $H_1(f)$ and an estimated value $\hat{H}_2(f)$ of $H_2(f)$ according to a first formula:

$$Z(f) = H_1(f)S(f) + H_2(f)S^*(-f), \text{ and}$$

wherein $S(f)$ is the basic frequency-domain reference signal, $S^*(-f)$ is the image frequency-domain reference signal, $Z(f)$ is a frequency-domain self-interference reference signal, $H_1(f)$ is the first comprehensive frequency-domain response, $\hat{H}_1(f)$ is the estimated value of the first comprehensive frequency-domain response $H_1(f)$, $H_2(f)$ is the second comprehensive frequency-domain response, and $\hat{H}_2(f)$ is the estimated value of the second comprehensive frequency-domain response $H_2(f)$.

\* \* \* \* \*

UNITED STATES PATENT AND TRADEMARK OFFICE
CERTIFICATE OF CORRECTION

PATENT NO. : 10,193,684 B2
APPLICATION NO. : 15/347633
DATED : January 29, 2019
INVENTOR(S) : Teyan Chen Page 1 of 1

It is certified that error appears in the above-identified patent and that said Letters Patent is hereby corrected as shown below:

In the Claims

In Column 43, Line 52, Claim 3, delete "argmin" and insert --arg min--.

In Column 44, Line 17, Claim 4, delete "argmin" and insert --arg min--.

In Column 46, Line 63, Claim 8, delete "(n" and insert --(f)--.

In Column 48, Line 16, Claim 10, delete "argmin" and insert --arg min--.

In Column 49, Line 15, Claim 11, delete "argmin" and insert --arg min--.

Signed and Sealed this
Ninth Day of April, 2019

Andrei Iancu
*Director of the United States Patent and Trademark Office*